US011361526B2

(12) United States Patent
Gupta et al.

(10) Patent No.: US 11,361,526 B2
(45) Date of Patent: Jun. 14, 2022

(54) CONTENT-AWARE SELECTION

(71) Applicant: Adobe Inc., San Jose, CA (US)

(72) Inventors: Subham Gupta, Roorkee (IN); Ajay Bedi, Hamirpur (IN); Poonam Bhalla, New Delhi (IN); Krishna Singh Karki, New Delhi (IN)

(73) Assignee: Adobe Inc., San Jose, CA (US)

( * ) Notice: Subject to any disclaimer, the term of this patent is extended or adjusted under 35 U.S.C. 154(b) by 110 days.

(21) Appl. No.: 17/013,171

(22) Filed: Sep. 4, 2020

(65) Prior Publication Data

US 2020/0401831 A1 Dec. 24, 2020

Related U.S. Application Data

(63) Continuation of application No. 16/264,387, filed on Jan. 31, 2019, now Pat. No. 10,817,739.

(51) Int. Cl.
*G06F 3/0482* (2013.01)
*G06V 10/22* (2022.01)
*G06F 3/04845* (2022.01)
*G06V 30/262* (2022.01)
*G10L 15/22* (2006.01)
*G10L 15/26* (2006.01)

(52) U.S. Cl.
CPC ......... *G06V 10/235* (2022.01); *G06F 3/0482* (2013.01); *G06F 3/04845* (2013.01); *G06V 30/268* (2022.01); *G06V 2201/10* (2022.01); *G10L 15/22* (2013.01); *G10L 15/26* (2013.01)

(58) Field of Classification Search
CPC ... G06F 3/0482; G06F 3/04845; G10L 15/22; G10L 15/26; G06K 2209/27; G06K 9/2081; G06K 9/723; G06K 9/00671
See application file for complete search history.

(56) References Cited

U.S. PATENT DOCUMENTS 7,657,100 B2 * 2/2010 Gokturk .................. G06K 9/46
382/209
7,978,936 B1 7/2011 Casillas
(Continued)

OTHER PUBLICATIONS

Shaoqing Ren "Faster R-CNN: Towards Real-Time Object Detection with Region Proposal Networks" IEEE Transactions on Pattern Analysis and Machine Intelligence 39 (6), arXiv:1506.01497v1, Jun. 4, 2015, 10 pages.
(Continued)

*Primary Examiner* — Ian L Lemieux
(74) *Attorney, Agent, or Firm* — Kilpatrick Townsend & Stockton LLP

(57) ABSTRACT

An image editing program can include a content-aware selection system. The content-aware selection system can enable a user to select an area of an image using a label or a tag that identifies object in the image, rather than having to make a selection area based on coordinates and/or pixel values. The program can receive a digital image and metadata that describes an object in the image. The program can further receive a label, and can determine from the metadata that the label is associated with the object. The program can then select a bounding box for the object, and identify in the bounding box, pixels that represent the object. The program can then output a selection area that surrounds the pixels.

20 Claims, 22 Drawing Sheets

(56) References Cited

U.S. PATENT DOCUMENTS

| | | |
|---|---|---|
| 8,854,491 B2 | 10/2014 | Ford |
| 8,963,960 B2 | 2/2015 | Gilra |
| 10,089,330 B2 | 10/2018 | Gao |
| 10,460,033 B2 | 10/2019 | Cohen |
| 10,467,739 B2 | 11/2019 | Bedi |
| 10,699,167 B1 * | 6/2020 | Dowdall .............. G06K 9/6263 |
| 2002/0055955 A1 | 5/2002 | Loyd-Jones |
| 2010/0226566 A1 | 9/2010 | Luo |
| 2014/0270407 A1 | 9/2014 | Blakrishnan |
| 2015/0131872 A1 | 5/2015 | Ganong |
| 2015/0371422 A1 | 12/2015 | Kokemohr |
| 2017/0062014 A1 | 3/2017 | Liu |
| 2018/0114097 A1 | 4/2018 | Wang et al. |
| 2018/0197040 A1 | 7/2018 | Krishnamurthi |
| 2019/0318405 A1 * | 10/2019 | Hu ...................... G06F 3/04842 |
| 2019/0340462 A1 | 11/2019 | Pao et al. |

OTHER PUBLICATIONS

Notice of Allowance from related U.S. Appl. No. 16/264,387 dated Jun. 5, 2020, 17 pages.

* cited by examiner

CONTENT-AWARE SELECTION

RELATED APPLICATIONS

The present application is a continuation of U.S. application Ser. No. 16/264,387 for "Content-Aware Selection" filed Jan. 31, 2019, which is incorporated by reference herein in its entirety for all purposes.

BACKGROUND

Image editing programs enable digital content creators to draw and/or edit digital images. An image editing program can include a graphical user interface in which a user can view and edit an image. In some examples, the image editing program includes drawing tools, such as pencils, brushes, and erasers, among other examples, each of which can include a number of controllable settings. The image editing program can further include editing tools, such as tools for selecting or deselecting areas of the image, for copying or moving pixels, for adjusting colors, luminance, or chrominance values, for transforming the size, shape, or orientation of a set of pixels, and other tools. In some examples, an image editing program can provide editing capabilities beyond what is possible using analog media. For example, the image editing program enable an image to be editing in a three-dimensional fashion, using layers. In this example, changes can be made to the pixels in one layer without affecting the pixels in another layer. Alternatively, one layer can affect or control the changes in another layer. Layers can be used for purposes such as these, and/or for many other uses.

An often-used set of tools in image editing programs is selection tools. Selection tools enable the user to select specific areas of an image, including being able to select all of an image. To make a selection, an image editing program can include, for example, tools that enable a user to draw a box, an ellipse, or a freehand shape around an area, or to select an area defined by a row or column of pixels. As another example, the program can include a tool to select an area by specifying a color and/or tone of the pixels in the area. As another example, the program can include a tool that operates on edge detection, such that an area is selected based on an edge (e.g., a difference neighboring pixel values) being detected.

Once the user has selected an area of the image, the user can use the selection for various purposes. For example, the user can copy or move the pixels in the selected area to another part of the image or to another layer. As another example, the user can make adjustments to pixels in the selected area (e.g., changing the color or tone, and/or other adjustments) without affecting pixels in other areas. As another example, the user can invert the selection, so that the area that was selected is now excluded from selection. In this example, the user can make changes to parts of the image without affecting the area originally selected. Selections can be used for these and many other uses.

BRIEF SUMMARY

In various implementations, an image editing program can include a content-aware selection system. The content-aware selection system can enable a user to select an area of an image using a label or a tag that identifies object in the image, rather than having to make a selection area based on coordinates and/or pixel values. The content-aware selection system can greatly simplify the task of selecting an object or objects in an image, a task that users perform frequently and which can be difficult and time consuming to preform when using selection tools that do not use pixel values or only operate on pixel values.

Examples described herein include a computer-implemented method including steps for performing the operations of content-aware selection; a computing device executing a content-aware selection system including one or more processors and a non-transitory computer-readable medium including instructions that, when executed by the one or more processors, cause the one or more processors to perform operations for performing content aware selection; and a non-transitory computer-readable medium having stored thereon instructions that, when executed by one or more processors, cause the one or more processors to perform operations for content-aware selection. The operations for content-aware selection can include receiving a digital image and metadata associated with the digital image, wherein the metadata describes an object in the digital image using a bounding box and a label, the bounding box including a rectangular region of the digital image, the rectangular region including a set of pixels that represent the object. The operations can further include receiving input identifying a particular label. The operations can further include determining that the particular label corresponds to the label describing the object. The operations can further include selecting, using the label the bounding box describing the object. The operations can further include identifying, within the rectangular region included in the bounding box, the set of pixels that represent the object. The operations can further include outputting a selection area, the selection area surrounding the set of pixels.

In some aspects, the methods, computing devices, and instructions stored on the non-transitory computer-readable medium can include further operations. The further operations can include receiving input corresponding to selection of a location within the digital image. These operations can further include determining that the location is within the rectangular region included by the bounding box. The operations can further include generating a list of objects for which the selection area can be generated, the list of objects including the label. In some aspects, the further operations can include generating an onscreen menu, the onscreen menu including the list of objects, wherein the input identifying the particular label is received when the particular label is selected from the onscreen menu. In some aspects, the further operations can include determining that the location is within a second rectangular region included by a second bounding box, wherein the second bounding box is associated with a second label. The operations can further include adding the second label to the list of objects. In some aspects, the further operations can include determining, from the metadata, that a second bounding box has a second label that is similar to the label. These operations can further include adding a pluralized version of the label to the list of objects.

In some aspects, the further operations can include determining, from the metadata, a second label, wherein the second label is for a super-category of the label. These operations can further include determining that the super-category includes more than one object. The operations can further include adding the second label to the list of objects.

In some aspects, the input corresponding to selection of the location includes a stream of locations. In these aspects, the operations can further include updating the list of objects for each location in the stream of locations.

In some aspects, the further operations can include receiving input corresponding to selection of a location within the digital image. These operations can include determining that the location is outside of all bounding boxes included in the metadata. The operations can include generating a list of objects for which the selection area can be generated, the list of objects include a label for each bounding box included in the metadata. In some aspects, these operations can include adding a label to the list of objects for selecting all objects.

In some aspects, the further operations can include determining that the particular label is for a super-category, the super-category including the label. These operations can further include determining that the super-category includes a second label associated with a second bounding box. The operations can further include identifying, within the a second rectangular region, a second set of pixels representing a second object, wherein the selection area also surrounds the second set of pixels.

In some aspects, the input includes selection of a location within the digital image, and wherein identifying the particular label includes determining a particular bounding box that includes the location. In some aspects, the input is derived from an onscreen menu. In some aspects, the input is a text string derived from voice input.

In some aspects, the further operations can include receiving input corresponding to generating of a new layer. These operations can further include providing the label to be used as a name of the new layer.

In some aspects, the metadata further describes relationships between objects in the digital image using a tree of nodes, wherein a node that has sub-nodes has a label that is a super-category of labels of the sub-nodes.

In some aspects, the further operations can include performing object recognition on the digital image, wherein the object recognition produces the bounding box and one or more labels for the object. These operations can further include filtering the one or more labels using a lexical dictionary, wherein filtering produces a set of labels from the one or more labels. The operations can further include determining one or more hierarchical relationships between the set of labels. The operations can further include generating the metadata, the metadata further including the one or more hierarchical relationships.

In some aspects, identifying the set of pixels includes using a subject selection tool, wherein the subject selection tool uses a neural network to identify the set of pixels, wherein the neural network is trained for recognizing objects, and wherein the neural network applies one or more filters to distinguish a pixel representing the object from other pixels in the digital image.

Examples described herein include a computer-implemented method including steps for performing the operations of content-aware selection; a computing device executing a content-aware selection system including one or more processors and a non-transitory computer-readable medium including instructions that, when executed by the one or more processors, cause the one or more processors to perform operations for performing content aware selection; and a non-transitory computer-readable medium having stored thereon instructions that, when executed by one or more processors, cause the one or more processors to perform operations for content-aware selection. The operations can include receiving a digital image. The operations can further include inputting the digital image into an object recognition tool, wherein the object recognition tool outputs a description of an object detected in the image, the description including bounding box and labels, the bounding box including a rectangular region of the digital image where the object was detected. The operations can further include filtering the labels using a lexical dictionary, wherein filtering produces a set of the labels from the labels. The operations can further include determining one or more relationships between the set of labels, the one or more relationships including a super-category associated with a first label and a sub-category associated with a second label, wherein the super-category includes all labels in the sub-category. The operations can further include generating metadata for the digital image, wherein the metadata describes the object using the bounding box, the set of labels, and the one or more relationships.

In some aspects, the description of the object further incudes a confidence score, the confidence score indicating a probability that the labels correctly identify the object. In these aspects, the operations can further include omitting the description of the object from the metadata when the confidence score is less than a threshold.

In some aspects, the lexical dictionary groups words that are conceptually similar. In these and other aspects, the operations can further include identifying, using the lexical dictionary, a first label from the labels and a second label from the labels, wherein the first label and the second label are conceptually similar. The operations can further include combining the first label and the second label into a new label. In some aspects, the operations can further include identifying, using the lexical dictionary, a first label from the labels and a second label from the labels, wherein the first label and the second label are conceptually similar. These operations can further include determining, using the lexical dictionary, a priority between the first label and the second label. The operations can further include removing the first label based on the first label having a lower priority than the second label.

In some aspects, the lexical dictionary organizes conceptually similar words into super-categories and sub-categories, wherein words in a super-category describe words in a sub-category of the super-category. In some aspects, the lexical dictionary includes priorities for words, wherein the priorities are based on frequency of usage.

In some aspects, the one or more relationships are organized in a tree of nodes, each node including a label from the set of labels. In these and other aspects, a node that has sub-nodes has a label for a super-category of labels of the sub-nodes. In some aspects, each node includes a count of sub-nodes of the node. In some aspects, a leaf node is associated with the description of the object.

In some aspects, performing object recognition can include using an object recognition tool. In these aspects, the object recognition tool uses a neural network to detect the object, wherein the neural network is trained for recognizing objects.

BRIEF DESCRIPTION OF THE DRAWINGS

Illustrative examples are described in detail below with reference to the following figures.

DETAILED DESCRIPTION

Figure 1:
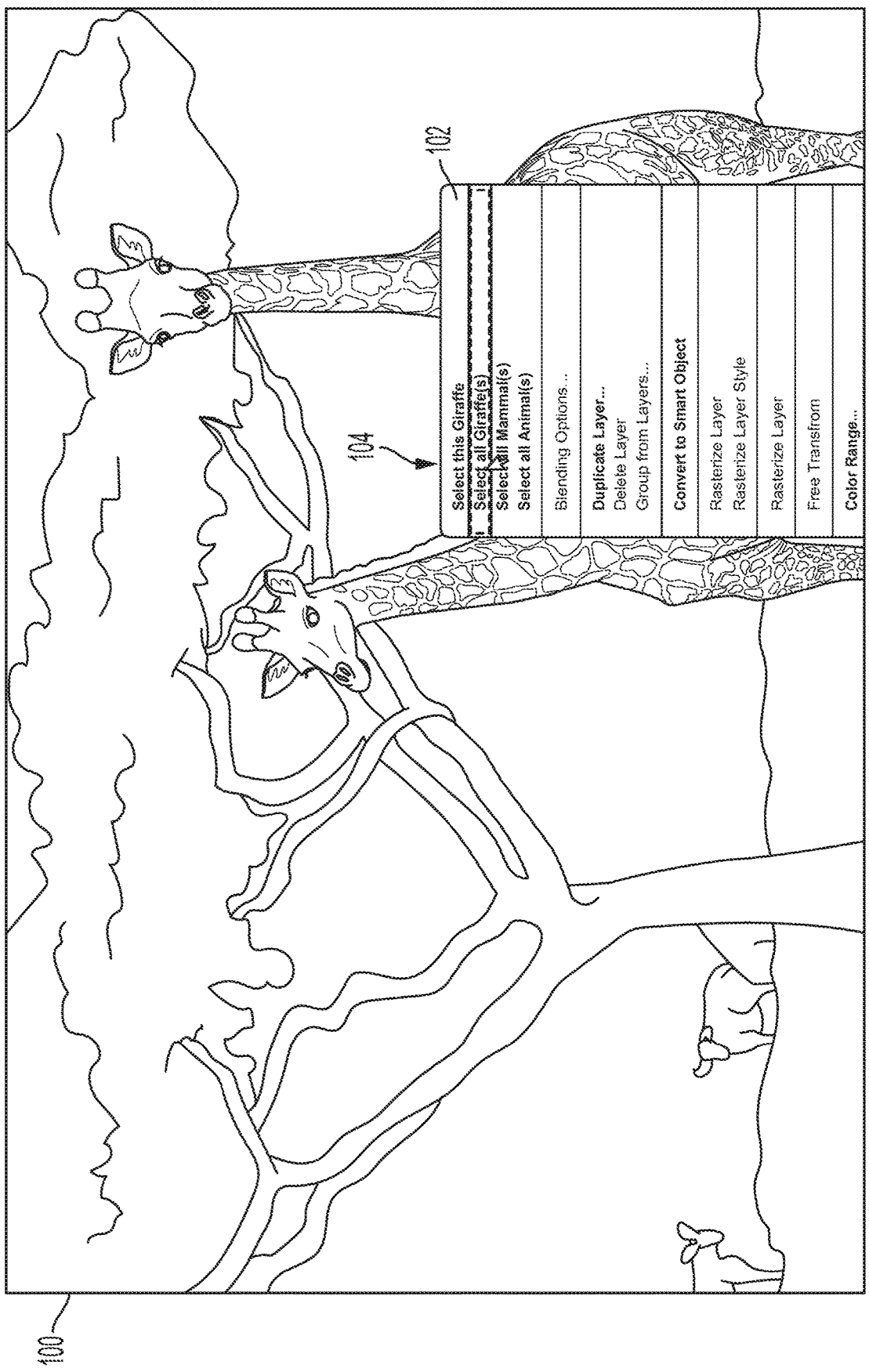
FIG. 1 includes a screenshot of an example of an image 100 being edited.

In various implementations, an image editing program can include a content-aware selection system. The content-aware selection system can enable a user to select an area of an image using a label or a tag that identifies object in the image, rather than having to make a selection area based on coordinates and/or pixel values. For example, for an image that includes a dog and a cat, the content-aware selection system can enable a user to input the label "dog," upon which the content-aware selection system will generate a selection area around the pixels that represent the dog. As a further example, the system can enable the user to input the label "animals," which will generate a selection area including the pixels for both the dog and the cat.

The content-aware selection system can greatly simplify the task of selecting an object in an image, a task that users perform frequently and which can be difficult and time consuming to preform when using selection tools that only operate on pixel values. Instead of having to draw a selection boundary around an object, or painting over the area that contains the object, users can click or tap on the object, and the content-aware selection system can automatically draw a selection area around the object. The content-aware selection system may be particularly useful when an image editing program supports voice input. With voice input, the user can speak a phrase such as "select the dog," and the content-aware selection system will generate a selection area around the dog, without the user needing to provide any physical input. The content-aware selection system improve the image editing process, in terms of speed and accuracy.

Other tools for generating a selection area include ones that enable the user to draw a box, an ellipse, or a freehand shape to circumscribe a region of the image. These tools do not make use of pixel values, however, and thus are not able to capture the intricate outlines of natural shapes such as people, animals, or trees, to name a few examples. Selection tools that use pixel values can generate a selection area by looking at a pixel and/or the pixel's neighbor. For example, a tool (which, in some contexts, is referred to as a magnetic lasso) can use edge detection to find differences in neighboring pixels that may represent boundaries between regions of the image. In this example, the user can click or drag a pointer near the area where the pixel differences are located, and the tool can place the selection area outline along the boundary between the pixel differences. As another example, a tool (which may be referred to as a magic wand) can generate a selection area using the tone and/or color of pixels. In this example, the user can click or tap on a part of the image that has a particular color or tone, and the tool will automatically generate a selection area that encompasses pixels that match or approach the same color and/or tone. As another example, a tool (which may be referred to as quick selection) can use pixel tone and color as well as texture, which can enable the tool to find edges. In this example, the user can "paint" (e.g., drag a pointer, stylus, or finger) over an area, and the tool will attempt to find, among the pixels being painted over, ones that are similar in tone, color, and/or texture, while rejecting ones that are dissimilar.

Each of the tools discussed above can help the user to make more precise selection areas, but the pixel-based tools may nevertheless require some practice to use well. Thus, to further assist the user, an image editing program can include what will be referred to herein as a select subject or subject selection tool. The select subject tool can analyze an image, and can generate a selection area around pixels that represent the most prominent object in the image. To identify the most prominent object in the image, the select subject tool uses a machine learning algorithm that has been trained on corpus of images that may include common subjects such as people, animals, vehicles, and so on. Using the machine learning algorithm, the select subject tool can attempt to match the contents of an image against other images that may be similar, and using this comparison, can generate a selection area outline around pixels that are sufficiently similar.

The select subject tool, however, as well as other selection tools, do not make use of content of an image when generating a selection. Each of the preceding tools may only make use of pixel values, and may not make use of any information about what the pixels represent.

An image editor that includes a content-aware selection system, however, can enable generation of selection areas using the content of an image. To identify the content of the image, the content-aware selection system can perform objection recognition. Using an object recognition engine, the content-aware selection system can both identify objects and determine one or more labels that describe each object. Additionally, the object recognition engine can output a confidence score, which can indicate a probability that the labels are correct. An object's location and approximate dimensions can be described using a bounding box, whose width and height encompassed the pixels of the object and whose coordinates (e.g., the location of the upper left corner) can be used to locate the object.

After object recognition, the content-aware selection system can perform filtering of the objects and labels. Objects identified with a low confidence score (e.g., below a threshold) may be incorrectly identified, or may be insufficiently distinct in the image to be properly identified. Thus, these objects may be removed from the list of identified objects, because the content-aware selection system may not be able to select these objects properly, or these objects may not be of interest to the user. Additionally, not all labels for objects that have a high confidence score may be of interest to a user. For example, some labels may be considered redundant, or there may be labels that users are not likely to use. To determine relevant labels, the content-aware selection system can use a lexical dictionary that can indicate object names most frequently used by a populace.

Once the labels have been filtered, the content-aware selection system can then generate a relationship tree for the labels. The content-aware selection system can determine, for example, synonyms, hyponyms, and hypernyms among the labels, and can use hypernym labels as super-categories for the labels that are encompassed by the hypernym labels. Additionally, the content-aware selection system can group together homonym labels into the same category.

The relationship tree, the bounding boxes, and the filtered labels can be provided to an image editor as object metadata, along with the image. When the content-aware selection system is enabled, a user can indicate a label, and the content-aware selection system will automatically generate a selection area around one or more objects identified by the label. For example, the user can "right-click" (e.g., click a right mouse button) on an area of the image that includes a particular object. The content-aware selection system can determine a location of an onscreen pointer when the right-click occurred, and can use the location to identify a bounding box at or near the location. The content-aware selection system can then populate an onscreen menu, triggered by the right-click, with one or more labels for the object in the bounding box.

When the user selects a particular label, the content-aware selection system can use the relationship tree to determine which objects are identified by the label. For example, when the label is in a leaf of the tree, then only one object is identified. As another example, when the label is a super-category, then more than one object may be identified. In these and other examples, the content-aware selection system can determine a list of the bounding boxes that are identified by the label. The content-aware selection system can then submit the regions defined by the bounding boxes to the subject selection, for the subject selection tool to identify the pixels of the object in the region defined by each bounding box. The subject selection tool can, for each bounding box, output a boundary defining a selection area, and the content-aware selection system can combine multiple boundaries into one selection area. The user can then use the selection area using various tools in the image editor that can make use of selection areas.

The content-aware selection system provides advantages over other pixel-based selection tools, in that the user does not have to perform difficult drawing or painting to define the selection area. Additionally, the content-aware selection system leverages the capabilities of the subject selection tool by giving users the ability to identify the content to be selected, which can provide more fine-grained selection areas than when the subject selection tool is used alone.

FIG. 1 includes a screenshot of an example of an image 100 being edited. The screenshot may have been taken while the image 100 was in an image editor component of an image editing program. For example, the image editing program can include a graphical user interface in which a user can view the image 100 and manipulate the image 100. The image editor further includes a content-aware selection system, as discussed further below. The image editor may include elements that are not illustrated here, such as a menu bar, a scroll bar, and/or window controls, among other examples.

The example image 100 includes two giraffes, as well as foliage and other animals that are out of focus. Illustrated over the image 100 is an onscreen menu 102, which can be activated by clicking a right mouse button, a stylus button, another button mapped to the same function, or a tap input on a touchscreen or touch digitizer. In the example of FIG. 1, the user selected (e.g., using a mouse, stylus, or finger, among other examples) on or near the giraffes while a content-aware selection tool is active, and the image editor responded by generating the onscreen menu 102. Because content-awareness is enabled, the onscreen menu 102 has been populated with selection options list 104, which includes labels for objects in the vicinity of the user's selection. In the example of FIG. 1, the selection options list 104 includes "Giraffe" for the one giraffe on the left.

The content-aware selection system, however, has determined not only the label "Giraffe" for each of the giraffes, but has also determined super-categories for these labels. In the example of FIG. 1, the super-categories include, in order of more specific to less specific, "Giraffe(s)," "Mammal(s)," and "Animals," which the content-aware selection system has provided in the selection options list 104. Using one of these labels, the user can generate a selection area around either the one giraffe on the left, both giraffes, all mammals present in the image (which may include the water buffalo in the background) or all animals present in the image.

Note that herein, "select" and "selection" describe clicking of a mouse, tapping of a stylus, and/or tapping of a finger on an image being edited (where tapping may occur on a touch screen or a digitizing tablet, among other examples). "Selection area" herein describes a region of an image around which a boundary has been defined, where pixel coordinates within the boundary are considered as included within the selection area while pixel coordinates outside the boundary are considered excluded from the selection area. In various examples, boundary can include an edge of the image. In some examples, an image editor may indicate the selection area boundary using a dashed line, which may be animated (e.g., the dashes flash on and off and/or "walk" around the boundary).

In the example of FIG. 1, the user's selection input on the image caused the onscreen menu 102 to be generated. When the user selects "Select all Giraffe(s)" from the onscreen menu 102, the image editor will respond by generating a selection area whose boundary traces the outlines of both giraffes.

Figure 2:
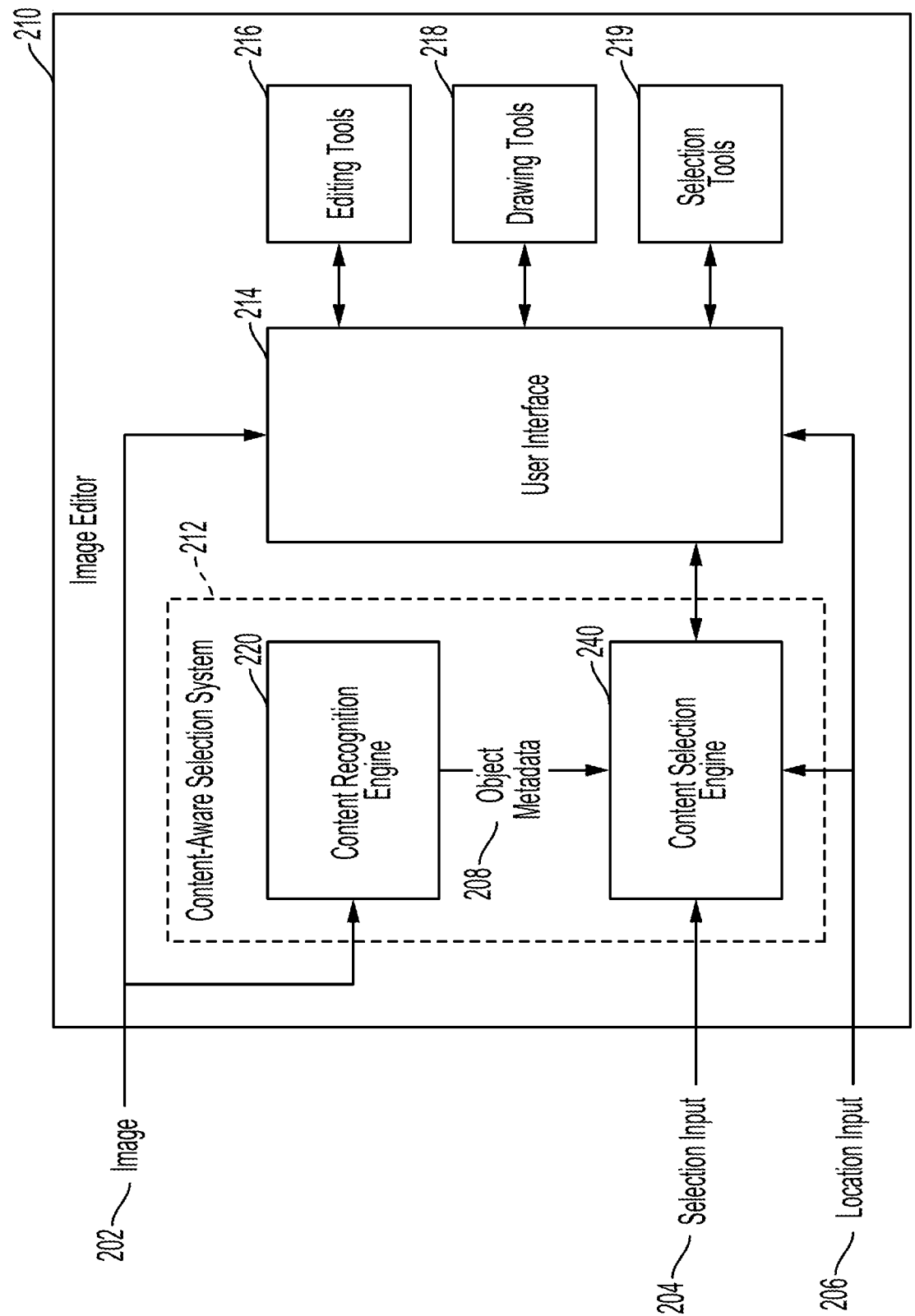
FIG. 2 includes a block diagram illustrating an example of an image editor 210 that includes a content-aware selection system.

FIG. 2 includes a block diagram illustrating an example of an image editor 210 that includes a content-aware selection system 212. The image editor 210 may be part of an image editing program, which may include other components, such as input file pre-preprocessing components, output file post-processing components, file format conversion components, rendering components, and other components. The image editing program, as well as the components of the image editing program, can be implemented as program instructions or program code, which can be stored on non-transitory computer-readable media (e.g., optical or magnetic disks or solid state drives, among other examples) and can be executed by a processor of a computing device. When executed, the processor can perform the various operations described by the program instructions.

The image editor 210 can open and/or load image 202, or possibly multiple images at the same time. The image 202 may input into the image editor 210 as a file that is structured according to a particular format, such as a Joint Photographic Experts Group (JPEG), Graphics Interchange Format (GIF), Tagged Image File Format (TIFF), Portable Network Graphics (PNG) format, another graphic format, a non-graphic format, or a proprietary format, among other examples. The image editor 210 can read the input file, and can interpret the image 202 as an array of pixels, where each pixel has a set of values that can describe the color and/or brightness of the pixel. As an example, each pixel can be represented with a Red, Green, Blue (RGB) value, which may each be an 8-bit, 16-bit, 24-bit value, or another-sized value. As another example, each pixel can be represented by a luminance value and a blue and red chrominance value, referred to as YCbCr or YUV. As another example, each pixel can be represented using cyan, magenta, yellow, and black (referred to as key) values, referred to as CMYK. RGB, YCbCr, and CMYK are a few examples of what may be referred to as different color spaces, or different was to represent color in a digital image.

The image editor 210 of FIG. 2 includes a user interface 214 through which a user can view the image 202. The user interface 214 can be a graphical user interface that the image editor 210 can configure for various types of display devices, such as monitors, laptop screens, tablet computer screens, or smartphone screens, among other examples. The user interface 214 can give the user access to various tools for manipulating the image 202. In the example of FIG. 2, these tools include editing tools 216, drawing tools 218, and selection tools 219. In other examples, the image editor 210 can include additional types of tools or other tools. In various examples, the editing tools 216 can enable the user to make changes to the image 202, such as changing the dimensions of the image 202, cropping the image, 202, changing colors or tones of pixels in the image 202, changing the hue, saturation, or brightness of the pixels, moving and/or copying pixels, and so on. The drawing tools 218 can enable the user to add visual elements to the image using tools that mimic pencils, pens, paint brushes, paint buckets, or stamps, among other examples. The selection tools 219 can enable the user to select areas of the image by drawing boxes, ellipses, or freehand shapes, or by tracing around or painting over an area, among other examples.

The content-aware selection system 212 can add a selection tool and/or augment an existing selection tool, so that the user can generate a selection area by specifying a textual label or tag, and without having to manually draw the selection area boundary or to paint over the area to be selected. The content-aware selection system 212 can be an additional software module or component of the image editor 210, or can be multiple additional modules or components. In some examples, one or more components or subcomponents of the content-aware selection system 212 can execute externally from the image editor 210, as discussed further below.

In various examples, the content-aware selection system 212 can include a content recognition engine 220 and a content selection engine 240. The content recognition engine 220 the ingests the image 202 and performs analysis of the image 202, including object recognition and object relationship building. The content recognition engine 220 can output object metadata 208 that describes each of the objects identified in the image 202, as well as relationships between labels that describe the objects. In some examples, the content recognition engine 220 can be activated when the image 202 is opened or loaded into the image editor 210. In some examples, the content recognition engine 220 can be activated at later times, such as at the request of the user or when the image's status is changed from an inactive mode (e.g., the image 202 is open in the image editor 210 but is not currently being viewed in the user interface 214) to an active mode (e.g., the image 202 is displayed in the user interface 214). In some examples, the content recognition engine 220 can be activated as an independent pre-processing program, which can be run with the image editor 210 is not being run. In some examples, the content recognition engine 220 can be included as a component of another program.

In some examples, the content recognition engine 220 performs object recognition and analysis on an image 202 each time the image 202 is input into the content recognition engine 220. In some examples, some or all of the object metadata 208 is provided with or encoded into the image 202, in which case the content recognition engine 220 can perform less processing or may not need to perform any processing. For example, the image 202 can be input into the content recognition engine 220 with object identification data, including bounding boxes describing the location and dimensions of each object and labels associated with each bounding box. In this example, the image 202 can skip object identification, and need only determine relationships between the objects. As another example, the object relationship can also be input with the image 202, in which case the content recognition engine 220 may only need to format the information provided with the image 202 into data structures that can be used by the content selection engine 240, or may not need to perform any processing.

In various examples, the a content selection engine 240 that interacts with the user interface 214 and operates on user input to generate a selection area. The user can, for example, generate location input 206 by using a mouse, stylus, finger or other another object that produces capacitive input, among other examples, to select somewhere on the image 202. The location input 206 can include, for example, the coordinates of a pixel or set of pixels in the image 202. The coordinates can be a horizontal coordinate and a vertical coordinate, where the upper left corner of the image 202 is considered position (0, 0) or (1, 1) and the lower right corner of the image is considered the maximum horizontal and vertical value (e.g., pixel (1080, 1920) in an image that is 1080 pixels high by 1920 pixels wide). Using the location input 206, the content selection engine 240 can identify one or more objects in the vicinity of the user's selection, and can output to the user interface 214 labels that identify these objects.

The user can, as another example, generate a selection input 204 that identifies a particular label. The selection input 204 can be generated, for example, when the user selects a label from a menu provided in the user interface 214. Alternatively, the selection input 204 can be obtained from a voice input component, which may be part of the image editing program or may be an external program. The voice input component can receive voice input commands in the form of an audio signal, and can process the audio signal into text. When a voice command is directed to the content selection engine 240, the text of the command can be input into the content selection engine 240 as the selection input 204.

In some examples, the content selection engine 240 can provide an additional selection tool that, when in use, enables the content selection engine 240. Alternatively or additionally, the content selection engine 240 can be enable for particular existing selection tools 219, or for all selection tools 219. In this case, the content selection engine 240 can provide a selection area generation mechanism that is in addition to the selection mechanism of the selection tool or tools for which the content selection engine 240 is active.

Figure 3:
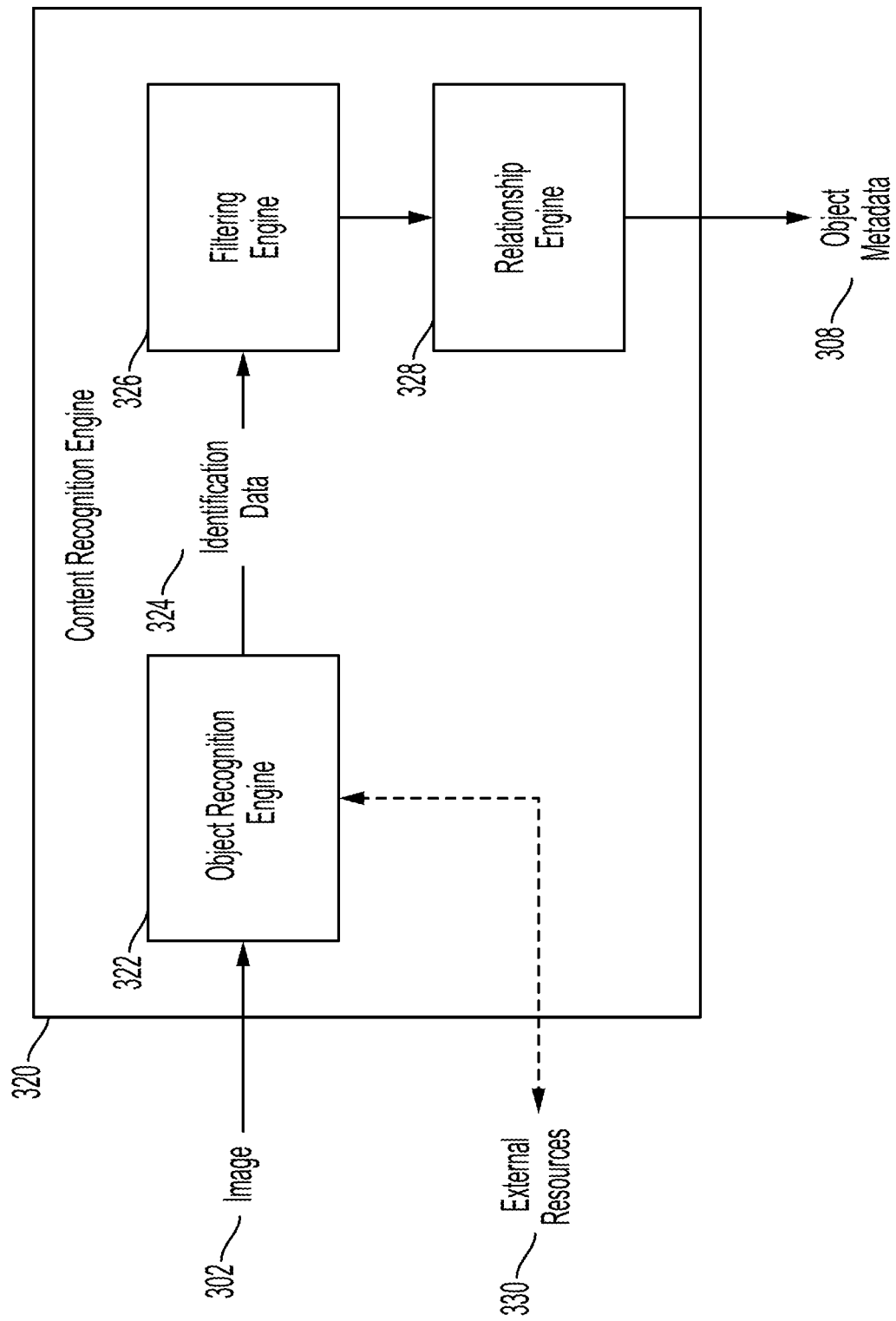
FIG. 3 includes a block diagram that illustrates in greater detail an example of a content recognition engine.

FIG. 3 includes a block diagram that illustrates in greater detail an example of a content recognition engine 320. The content recognition engine 320 of FIG. 3 can be used for the content-aware selection system of FIG. 2. Alternatively or additionally, the content recognition engine 320 of FIG. 3 can be used in a standalone program, or as a component of another program. A discussed above, the content recognition engine 320 can be implemented using program instructions, which can be stored on a non-transitory computer-readable medium, and can be executed by a processor of a computing device. When executed, the processor can perform the various operations discussed below.

As noted above, the content recognition engine 320 operates on an image 302 when the image 302 is opened or loaded into an image editor, or at other times. In the example of FIG. 3, the content recognition engine 320 inputs the image 302 into an object recognition engine 322. In various examples, the object recognition engine 322 can analyze the image 302, and can identify the various things represented by the pixels in the image in human terms. Additionally, the object recognition engine 322 can determine where in the image 302 each object is located. The location and approximate size of an object can be represented using a bounding box, where the width and height of the bounding box are approximately the width and height of the object, and a coordinate of the bounding box (e.g., the location of the upper left corner, the location of the middle of the upper boundary of the bounding box, the location of the center of the bounding box, or the location of another specific part of the bounding box) can indicate the location, within the image, of the object. To name or tag an object, the object's bounding box can be assigned one or more labels, or a vector of labels, where a label can be a textual description of the object, such as "girl," "face," or "person," among other examples. The content recognition engine 320 can further output a degree of certainty, or a probability that the object identification is correct, which is referred to herein as a confidence score.

The content recognition engine 320 can use various techniques to perform object detection and classification. For example, the content recognition engine 320 can use machine learning-based techniques, such as a neural network. Neural networks, such as convolutional neural networks (CNNs), are often used for detecting and/or classifying the objects in an image. A neural network can be trained to recognize classes or categories of objects, such as girls, dogs, and boats, for example, by being provided images that have been labeled as being of a girl, a dog, and/or a boat. Once trained, the neural network can be provided an image within unknown contents, and the neural network can output a probability (e.g., as a percentage or as a value between 0 and 1) that the image includes objects in one or more of these classes. For example, for a given image, the neural network can output "girl=0.9," "dog=0.04," and "boat=0.01," which indicates a high likelihood that the image includes a girl and does not include a dog or a boat.

The object recognition engine 322 can use one or more of various types of neural networks. For example, the object recognition engine 322 can use a Region Convolutional Neural Network (R-CNN), a Fast R-CNN, Faster R-CNN, or another type of neural network. For example, the object recognition engine 322 can use a neural network that is based on ResNet-101, a convolutional neural network that is trained on more than a million images from the ImageNet database. ResNet-101 is 101 layers deep and can classify images into 1000 object categories. Alternatively, the neural network can be trained on a more focused set of object categories, such as 518 (or another number) of categories that are considered relevant to content creators.

In some examples, the neural network used by the content recognition engine 320 can perform both object classification and object detection. Classification can produce one or more labels for an object, while detection can produce a bounding box for the object. For example, a neural network based on Faster R-CNN may be able to output bounding boxes as well as labels. Alternatively, the content recognition engine 320 can use one neural network (such as a CNN) for classification, and second neural network (such as an R-CNN) for detection. Alternatively, the content recognition engine 320 can use a neural network for classification, and another technique, such as background subtraction, to determine the locations of objects.

In some examples, the content recognition engine 320 internally includes program code to perform object classification and detection, such that the object classification and detection occurs within the executing process of the content recognition engine 320. In some examples, the content recognition engine 320 uses external resources 330 to perform classification and detection. For example, the content recognition engine 320 can send the image data to a program that is running external to the content-aware selection system, for this external program to perform the classification and/or detection. For example, the computing device on which the image editor is running may also be running a program that implements object detection and/or classification. As another example, the content recognition engine 320 can send the image data over a network to a network service that performs object detection and/or classification.

The content recognition engine 320 can output bounding boxes, labels associated with the bounding boxes, and confidence scores for each object as identification data 324. The identification data 324 can, for example, include a data structure for each identified object, where the data structure associates each object with a bounding box, one or more labels, a confidence score, and possibly also other information.

Not all the objects identified by the object recognition engine 322 may be correctly identified, and some (e.g., objects that are likely part of the background of the image 302), may not be of interest to the user. Additionally, not all object labels may be useful or of interest to the user. Thus, the content recognition engine 320 inputs the identification data 324 into a filtering engine 326. Filtering engine can, first, filter out any objects (and the identification data 324 associated with these objects) that have a confidence score that is less than a threshold. The threshold can be set at, for example, 80%, 75%, 50%, or another number. Removing objects that have a low confidence score can eliminate objects that have been misidentified, that may have been too out of focus to be identified correctly, and/or that may be a component of a larger object, among other examples.

In various examples, each object can be assigned one or more labels, where multiple labels may be provided in a vector. In some examples, in the label vector, the labels can be organized hierarchically, starting with, for example, the most precise label to the least precise label. For example, a label vector can include the words ("Beagle," "Dog," "Carnivore," "Animal," "Mammal"), in that order, or in the reverse of this order. In some examples, the labels may be in a random order.

For each object that has multiple labels, the filtering engine 326 can combine or remove labels that are similar, and can remove labels that may be unimportant or uninteresting. To determine similarity and relevance, in various examples, the filtering engine 326 can use a lexical dictionary, such as WordNet®. Using the lexical dictionary, the filtering engine 326 can identify labels that are synonyms (e.g., "person" and "human"). In some cases, the filtering engine 326 can also identify labels that are conceptually similar (e.g., "animal" and "carnivore"). In various examples, the filtering engine 326 can remove synonyms and conceptually similar labels, for example using priority scheme (e.g., the label to be kept is given a higher priority value than other labels). Alternatively or additionally, in some examples, the filtering engine 326 may combine synonyms and conceptually similar labels into a single label (e.g., "animal" and "carnivore" becomes "animal/carnivore"). In these examples, the combined label can be treated as a single label, and may undergo additional filtering. In some examples, the lexical dictionary can include weights associated with certain words, where the weights can indicate a relative importance of the words. For example, a "person" is also an "animal," but the "person" label may be given a higher weight, or the two labels may be given the same weight, so that the "person" label remains distinct from the "animal" label.

In some cases, combining or eliminating labels may result in an object no longer being distinct. For example, an object having the labels "Hand," and "BodyPart," and "Person" may be reduced to having only the label "Person." In examples such as this, the relationship engine 328 may determine to remove the object, or to combine the object with another. For example, the bounding box for the object may partially or fully overlap with another object. In this example, when the two objects have a similar label (e.g., the object with the "Hand" and "Person" labels overlaps with an object that has a "Person" label), then the objects may be combined. Whether the objects should be combined can be determined from a weight or priority assigned to the labels. For example, a "Hand" label may be given low priority, but a "Face" label may be given high priority, in which case the "Hand" object may be subsumed into a "Person" object, but the "Face" object is retained as a distinct object. When the object overlaps with an object that does not have a similar label, or does not overlap with any other objects, the relationship engine 328 may keep the object or may remove the object, based on various factors. For example, when the "Hand" object overlaps with or is adjacent to an object labeled "Car" or the object appears at the edge of the image 302, the relationship engine 328 may keep the label, because it is possible that the user may want to select and manipulate the pixels for object. As another example, the relationship engine 328 may remove the object when the lexical dictionary indicates that the object's label has a low priority. As another example, when the object is small as compared to other objects in the image 302 (e.g., a ratio of the objects' sizes, as indicated by the dimensions of the bounding boxes, is less than a threshold), the relationship engine 328 may remove the object because the object may be too small to be of interest. In various examples, the relationship engine 328 can consider other criteria when determining whether an object should be kept or removed.

The filtering engine 326 outputs objects that remain after filtering, along with the objects' filtered labels, to a relationship engine 328. The relationship engine 328 can determine super- and sub-categorical relationships between the labels of different objects, and can build a tree that can be used to determine similarities and differences between the various objects. In various examples, the relationship engine 328 can begin by generating a root node, which encompasses all objects in the image 302. In some examples, the relationship engine 328 can next determine each unique label, and can determine a count for how many objects have the same label. Alternatively, the relationship engine 328 can examine each label of each object. In either case, the relationship engine 328 can determine a label's location in the relationship tree by walking the tree and comparing the label to the label at each node in the tree. When a label is not found in the tree, then the relationship engine 328 can generate a new sub-node of the root node or the label. When the label is the same as the label at a node, the node's label count can be incremented. When the label is a hypernym (e.g., a super-category) of the label at the node, the relationship engine 328 can add the label in a new node that is made a super-node of the existing node. When the label is a hyponym (e.g., a sub-category) of the label at the node, the relationship engine 328 can add a sub-node to the node for the label. To determine hypernyms and hyponyms, the relationship engine 328 can use a lexical dictionary, which may be same lexical dictionary used by the filtering engine 326, or may be a different lexical dictionary.

The content recognition engine 320 can put the relationship tree that is output by the relationship engine 328, along with the bounding boxes that remain after filtering, and the labels associated with these bounding boxes, into object metadata 308 that can be used by other programs or software components, such as a content selection engine of the content-aware selection system. The object metadata 308 can be in a binary format, and can include various data structures into which the object data is organized. Alternatively, the object metadata 308 can be in a text format, such as eXtensible Markup Language (XML), JavaScript Object Notation (JSON), HyperText Markup Language (HTML), or another format. In some examples, the object metadata 308 can include, for any one object, all the labels that remain for the object after filter. In some examples, the object metadata 308 may include only one label for each object, such as the most specific label. In these examples, other labels for the object can be derived from the relationship tree.

Figure 4:
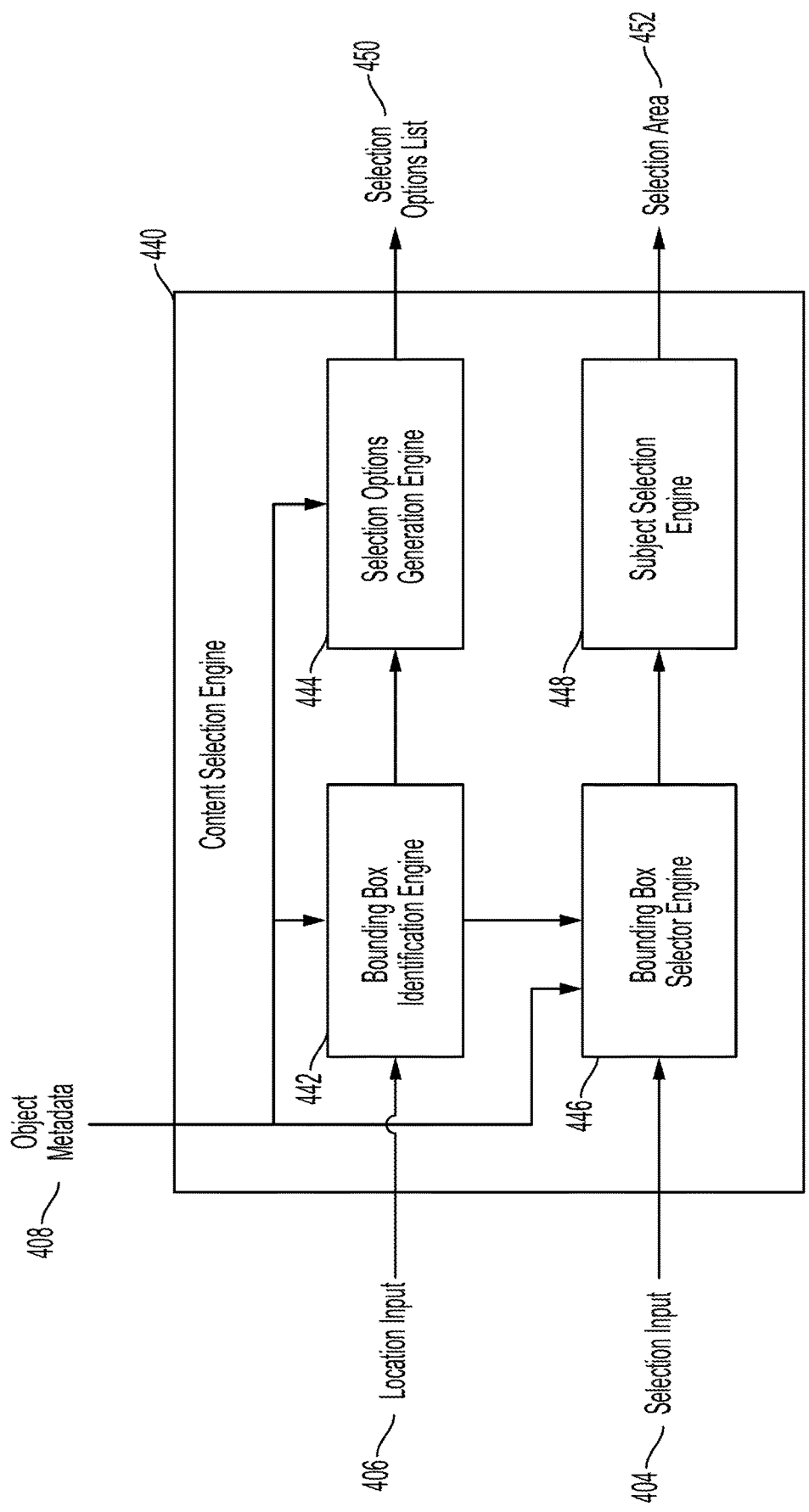
FIG. 4 includes a block diagram that illustrates in greater detail an example of a content selection engine.

FIG. 4 includes a block diagram that illustrates in greater detail an example of a content selection engine 440. In various examples, the content selection engine 440 of FIG. 4 can be used in the content-aware selection system illustrated in FIG. 1. As discussed above, the content selection engine 440 of FIG. 4 can work in concert with, or be a component of, a user interface for editing images. The content selection engine 440 can be implemented using program instructions, which can be stored on a non-transitory computer-readable medium, and can be executed by a processor of a computing device. When executed, the processor can perform the various operations discussed below.

The content selection engine 440 can may be inactive (e.g., not actively executing) until the image editor receives location input 406 or selection input 404, generated by the user. The location input 406 indicates a location in an image using, for example, the coordinates of a pixel. Alternatively or additionally, the location input 406 can indicate a region of the image, such as, for example, a region four pixels wide by four pixels high (or having another dimension) at a particular location.

The location input 406 may be generated when the user selects a point in the image by clicking on the image using a mouse or tapping on the image using a stylus or a finger (or another object capable of capacitive input), or by clicking or tapping on a menu bar or tool menu. The manner in which the selection occurred may trigger different responses within the user interface. For example, selection may have occurred using a left mouse button or a right mouse button (or the buttons on another input tool), which can be mapped to different functions. For right-handed users, the left mouse button can be mapped to a "select" function while the right mouse button can be mapped to an "options" function. For left-handed users, these functions may be reversed.

Alternatively, the location input 406 can be generated when the user drags a mouse pointer, a stylus, or a finger (or other capacitive object) across the image while a content-aware selection tool is enabled. In some cases, the selection tool may require concurrent pressing of a button for the location input 406 to be captured. The location input 406, in this instance, may be continually updating, providing the location of each pixel being passed over, every other pixel being passed over, or pixels at another interval.

The content selection engine 440 can input the location input 406 into a bounding box identification engine 442. The bounding box identification engine 442 can use the object metadata 408 (generated, as discussed above, by a content recognition engine) to identify a bounding box at or near the location input 406. As noted above, each bounding box has a width, height, and location, which may be indicated using a pixel coordinate. The location input 406 is thus within a bounding box when the location indicated by the location input 406 is within the rectangular region of the image that is described by the bounding box. In various examples, the bounding box identification engine 442 can identify more than one bounding box at the bounding box identification engine 442.

In some examples, the bounding box identification engine 442 can determine that the location indicated by the location input 406 is not within a particular bounding box, but is nevertheless in a specially designated location in the image. For example, the location may be in the upper left corner of the image or outside the limits of the image, among other examples. In this and other examples, the bounding box identification engine 442 can indicate to the selection options generation engine 444 that all the bounding boxes should be included in generating the selection options list 450.

The selection options generation engine 444 receives from the bounding box identification engine 442 on or more bounding boxes identified by the bounding box identification engine 442. The selection options generation engine 444 can use this information to determine labels associated with the bounding boxes, and output the labels as a selection options list 450. For example, when a bounding box has only one label, the bounding box identification engine 442 can add that label to the selection options list 450. Additionally, in this example, the selection options generation engine 444 can determine, from the relationship tree in the object metadata 408, super-category labels for the object (e.g., the relationship tree, for the label "Girl," may have a super-category label "Person"), and can add these labels to the selection options list 450. As another example, when the bounding box has multiple labels, the selection options generation engine 444 can add each of these labels to the selection options list 450. In these and other examples, the selection options generation engine 444 can reduce the selection options list 450 to only unique labels. Additionally, when more than one object in the image can be described by a label (e.g., there is more than one "Girl" in the image), as indicate by a count associated with the label, the selection options generation engine 444 can add a plural form of the label to the selection options list 450. In some examples, the selection options generation engine 444 may sort the selection options list 450 in order of the label that is most closely associated with the location input 406 to the label that is most generally associated with the location input 406. For example, the label of the bounding box at point indicated by the location input 406 can be listed first, while the label that describes the highest super-category of the bounding box can be last.

In various examples, the selection options list 450 can be used in various ways by an image editor's user interface. For example, the selection options list 450 can be used to generate an onscreen menu in response to a right mouse button click (or equivalent thereto), where the onscreen menu may be referred to as a context menu or a pop-up menu. In this example, each of the labels in the selection options list 450 can be included in the onscreen menu as an option for an object or group of objects to select. When the location input 406 is a continuously updating stream of data, the selection options generation engine 444 can continuously update the selection options list 450, and the user interface and refresh an onscreen menu using the updated data. In this case, as the user drags a mouse pointer across the image (for example), an onscreen menu can change to reflect the labels of the objects that the mouse pointer is passing over. In some examples, the selection options list 450 can also include the bounding boxes, or other boundary information for each object, and the user interface can use this information to highlight the object that can be selecting at a current location of an onscreen pointer. Highlighting can be performed by drawing the bounding box or object boundary around the object, changing the tone or shade of the pixels of the object, or in another manner. Other examples of ways in which the user interface can use the selection options list 450 include generating a pulldown menu that includes the labels in the selection options list 450, where the label can be triggered from a menu bar or tool menu.

The selection input 404 can be received separately and independently from the location input 406, or may be received in conjunction with location input 406. The selection input 404 can indicate a label. The user can specify the label by clicking or tapping on the label when the label is displayed in an onscreen menu (e.g., a context menu or a pulldown menu, among other examples). Alternatively, in some examples, the user can use content-aware selection tool to click or tap on an object in the image (e.g., using a left mouse button or equivalent thereto) to generate a selection area 452 around the object. In these examples, the selection input 404 can be accompanied by location input 406 that indicates where the user has clicked or tapped. Alternatively, in some examples, the image editing program may support voice input. The voice input may be processed directly by the image editing program, or may be processed by an external component. Processing the voice input can include performing speech-to-text conversion and identifying a component of the image editing program that is to receive the command. A command to the content selection engine 440 can include, for example, the word "select," and full commands can take the form of, for example, "select the dog," or "select all dogs," among other examples.

In various examples, the content selection engine 440 inputs the selection input 404 into a bounding box selector engine 446. The bounding box selector engine 446 can use the label identified by the selection input 404 to select one or more bounding boxes that are identified by the label, possibly with assistance from the bounding box identification engine 442 to identify bounding boxes indicated by the location input 406. The bounding box selector engine 446 can select bounding boxes, for example, by matching the label in the selection input 404 with the labels of the bounding boxes. Bounding boxes with matching labels are then added to a list of selected bounding boxes. Alternatively or additionally, the bounding box selector engine 446 can walk the relationship tree, and find a node whose label matches the label from the selection input 404. In this case, the bounding box selector engine 446 can add to the list of selected bounding box all bounding boxes that have labels that fall at or below the node.

The bounding box selector engine 446 can also, for each bounding box in the list of selected bounding boxes, extract from the image the pixels within the bounding box, and input those pixels into a selection engine 448. The selection engine 448 can perform subject selection, in which the selection engine 448 identifies the pixels of the most prominent object in the area defined by the bounding box. The selection engine 448 can use, for example, machine learning techniques to identify the pixels of the object. Because the selection engine 448 operates on a set of pixels identified by a bounding box, rather than the entire image, the object in the bounding box dominates the set of pixels, and the selection engine 448 subject selection algorithm can be focused on the locating the pixels of the object.

Using subject selection, the selection engine 448 can output a selection area 452 that includes the object or objects specified by the selection input 404. When the selection input 404 specified multiple objects, the selection engine 448 can perform subject selection on the bounding box for each object, and can combine the selection area of each object into a single selection area 452. In some examples, the selection area 452 may be discontinuous, and may include multiple areas within the image. For example, when selecting all "Persons," two people in the image may be standing some distance from one another, such that a selection boundary drawn around each person forms two selection boundaries. In this and other examples, the two selection boundaries are considered a single selection area, and may be treated as such by the image editor.

The image editor's user interface can visualize the selection area 452 as an outline around the objects that were selected, where the outline substantially follows the contours, edges, and intricacies of the object's shape. Once the selection area 452 is generated, the user can use the selection area 452 in any manner that is enabled by the image editor. For example, the user can use the selection area 452 to move or copy pixels within the selection area 452 to another part of the image or to another layer. When copying to a new layer, in some examples, the image editor can automatically set the name of the layer to the label of the object or objects that were specified. As another example, the user can use the selection area 452 to generate a mask. As another example, the user can invert the selection area 452, which causes all pixels except for the pixels of the objects to be selected. In this example, the user can make modifications to the image without affecting the objects.

Figure 5:
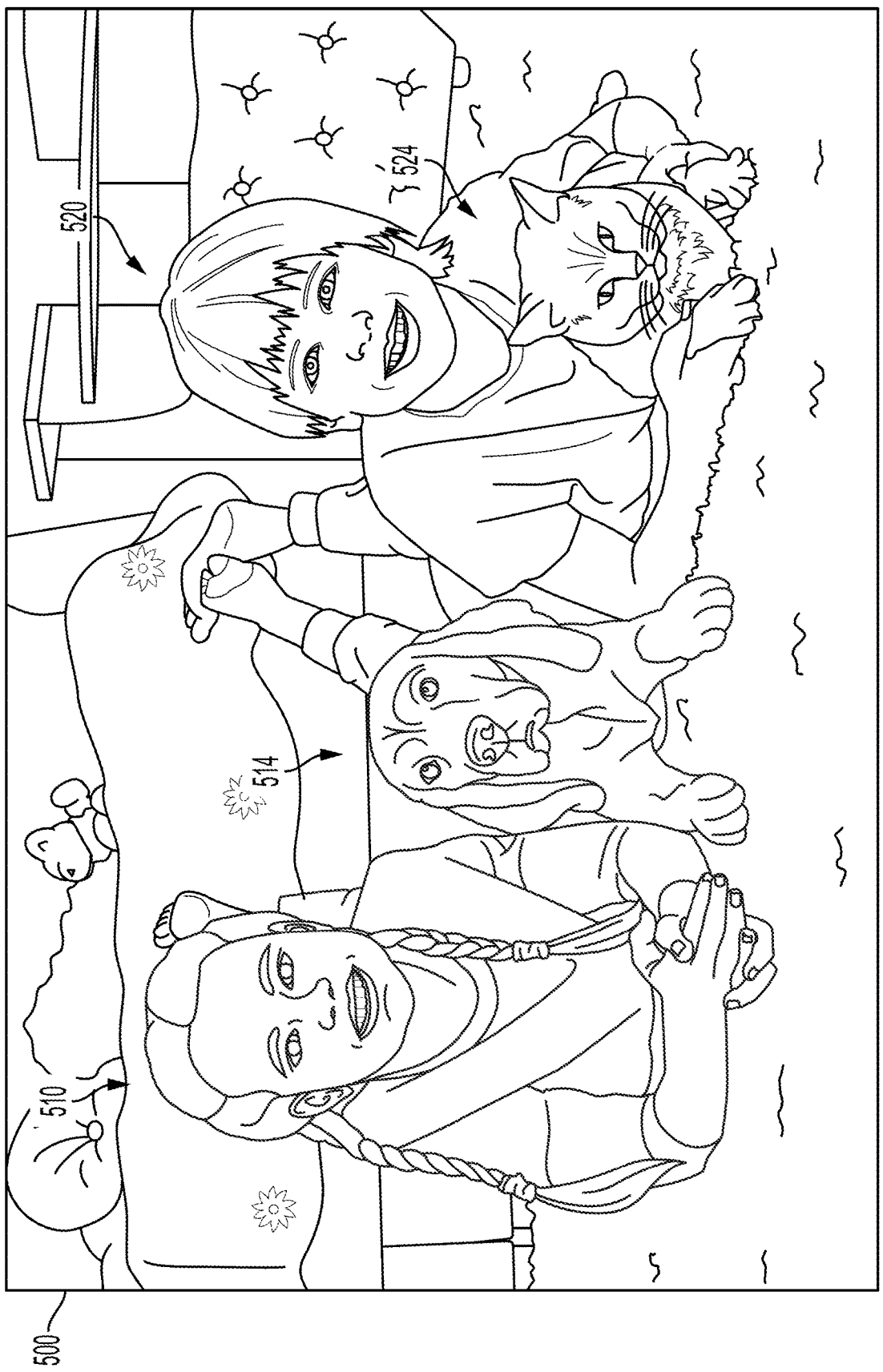
FIG. 5 illustrates an example image.

FIG. 5 illustrates an example image 500, which will be used in subsequent examples that describe in further detail the operations of a content-aware selection system. The example image 500 includes four objects that may be of interest to a user who is editing the image 500: a girl 510, a dog 514, a boy 520, and a cat 524. These objects are easily distinguishable to the human eye, and are mostly in focus, though a portion of the boy 520 is out of focus. Additionally, only a portion of each object is visible. Also visible in the image 500 or objects such as a bed, a desk, a stool or ottoman, pillows, and a stuffed bear, each of which are slightly out of focus as compared to the girl 510, dog 514, boy 520 and the cat 524.

Figure 6:
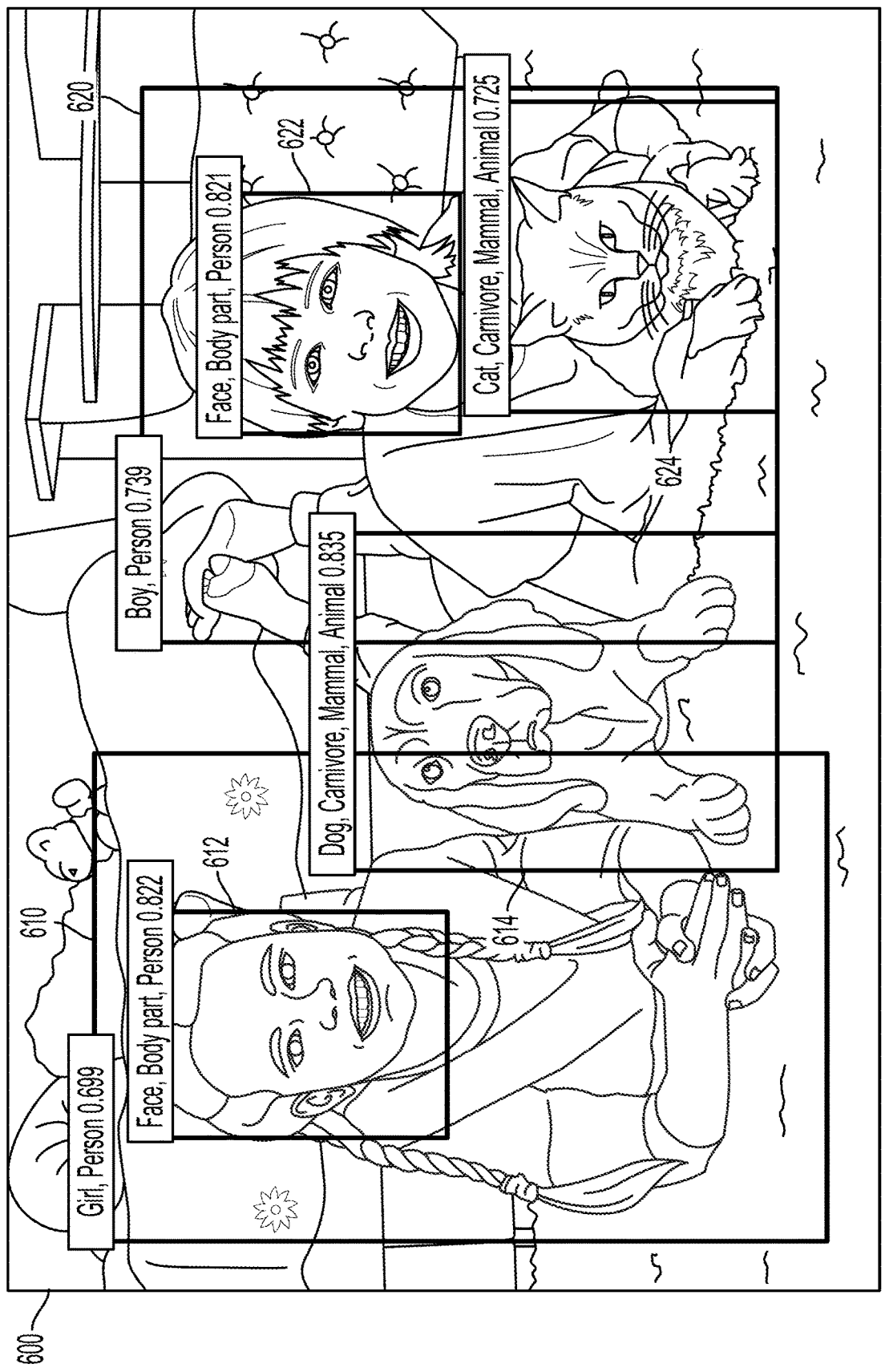
FIG. 6 illustrates an example annotated image.

After processing by the content recognition engine of the content-aware selection system, the image 500 can be associated with metadata that describes the four objects. FIG. 6 illustrates an example annotated image 600, where the image of FIG. 5 has been marked to indicate the bounding boxes, labels, and confidence scores that were determined by the content recognition engine. The bounding boxes and labels in FIG. 6 may be "raw" identification data, or data produced before filtering has been performed. The annotated image 600 of FIG. 6 is intended to give a visual example of an internal representation of the data being operated on by the content-aware selection system, and may not reflect a literal representation of the data or of an image that is seen by the user. In some examples, an image editor can include an option that, when enabled, can enable a user to see the bounding boxes, labels, and/or confidence scores.

As illustrated by the annotated image 600, the content-aware selection system has generated a first bounding box 610 that has the label vector "Girl,Person" and a confidence score of 0.699; a second bounding box 612 that has the label vector "Face,Body part,Person" and the confidence score 0822; a third bounding box 614 that has the label vector "Dog,Carnivor,Mammal,Animal" and the confidence score 0.835; a fourth bounding box 620 that has the label vector "Boy,Person" and the confidence score 0.739; a fifth bounding box 622 that has the label vector "Face,Body part, Person" and the confidence score 0.821; and a sixth bounding box 624 with the label vector "Cat,Carnivore,Mammal,Animal" with the confidence score 0.725. Other objects in the image may be insufficiently in focus for identification, or may not be shown here because the confidence score for these objects was too low (e.g., below a threshold of 0.65 or another value).

Figure 7:
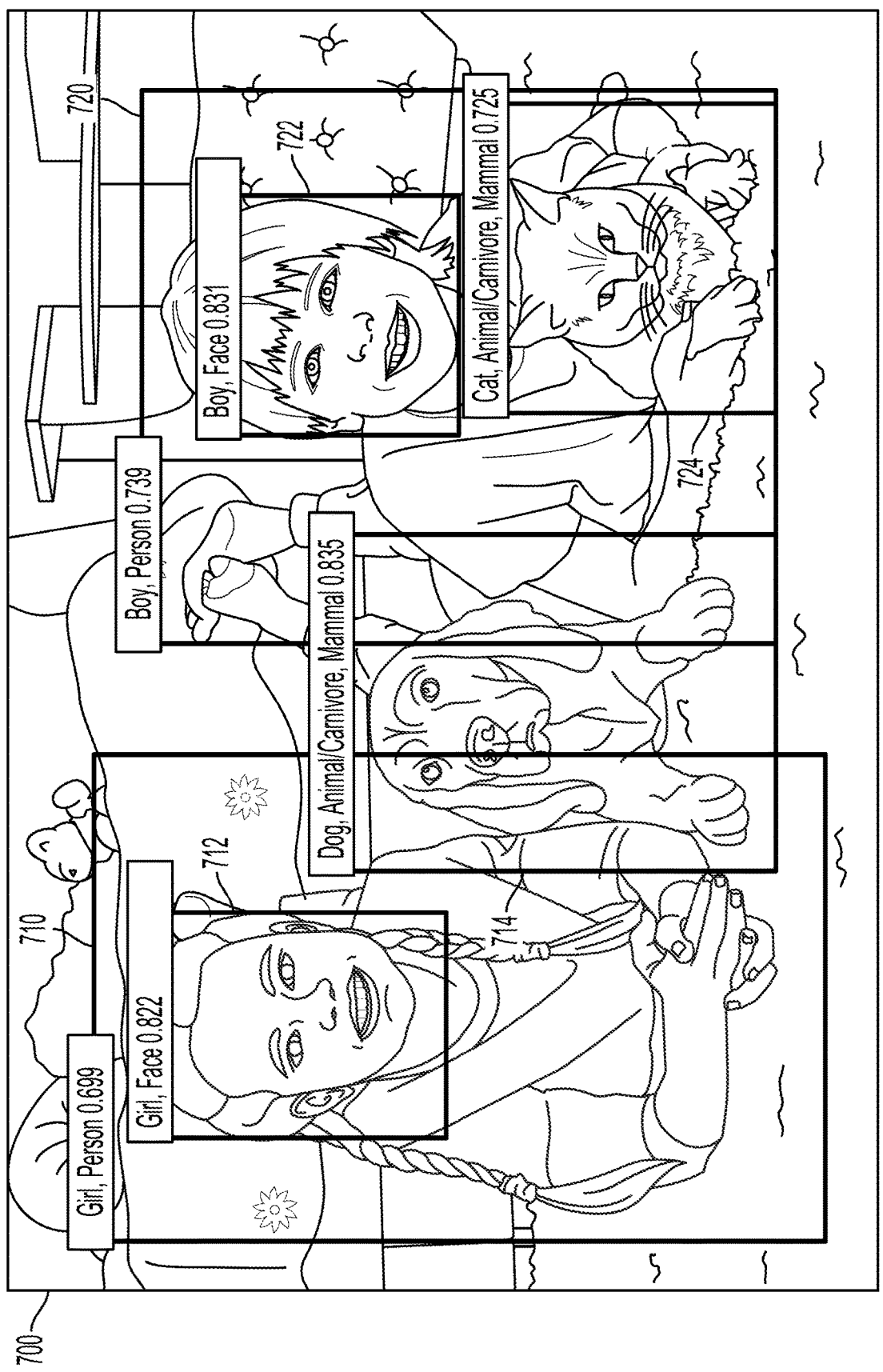
FIG. 7 illustrates another example annotated image.

FIG. 7 illustrates another example annotated image 700, where the labels illustrated in FIG. 6 have undergone filtering. As discussed above, filtering can combine similar labels, and/or can remove labels considered unimportant (e.g., having a priority value or weight that is below a threshold).

For a first bounding box 710, the labels "Girl,Person" are the same as before, because both may have a high priority value (e.g., above a threshold), and thus should both be retained. For a second bounding box 712, the labels "Face" and "Body part" have been combined into "Face." Additionally, because the second bounding box 712 overlaps with the first bounding box 710 and both bounding boxes originally had the label "Person," the second bounding box 712 has had the label "Girl" added to it, because, for example, the "Girl" label has a high priority.

For the third bounding box 714, the labels "Carnivore," "Animal," and "Mammal" may be considered equivalent, however, the label "Mammal" may have a higher priority while "Carnivore" and "Animal" have an equivalent priority. The "Animal" and "Carnivore" labels have thus been combined into a single "Animal/Carnivore" label while the "Mammal" label has been left unaltered.

The fourth bounding box 720 also has the same labels ("Boy,Person") as before, likely because these labels are have high priority. The labels for the fifth bounding box 722 have been modified in a similar fashion as the labels for the second bounding box 712, so that "Face," "Body part," and "Person" have been combined into "Face," and "Boy" has been added. As indicated by this example, by added the label of the overlapping, related (by label), and possibly higher priority object, the two faces in the image 700 can be distinguished from one another.

The sixth bounding box 724 also has fewer labels, with "Animal" and "Carnivore" reduced to a single "Animal/Carnivore," while "Mammal" was retained.

Figure 8:
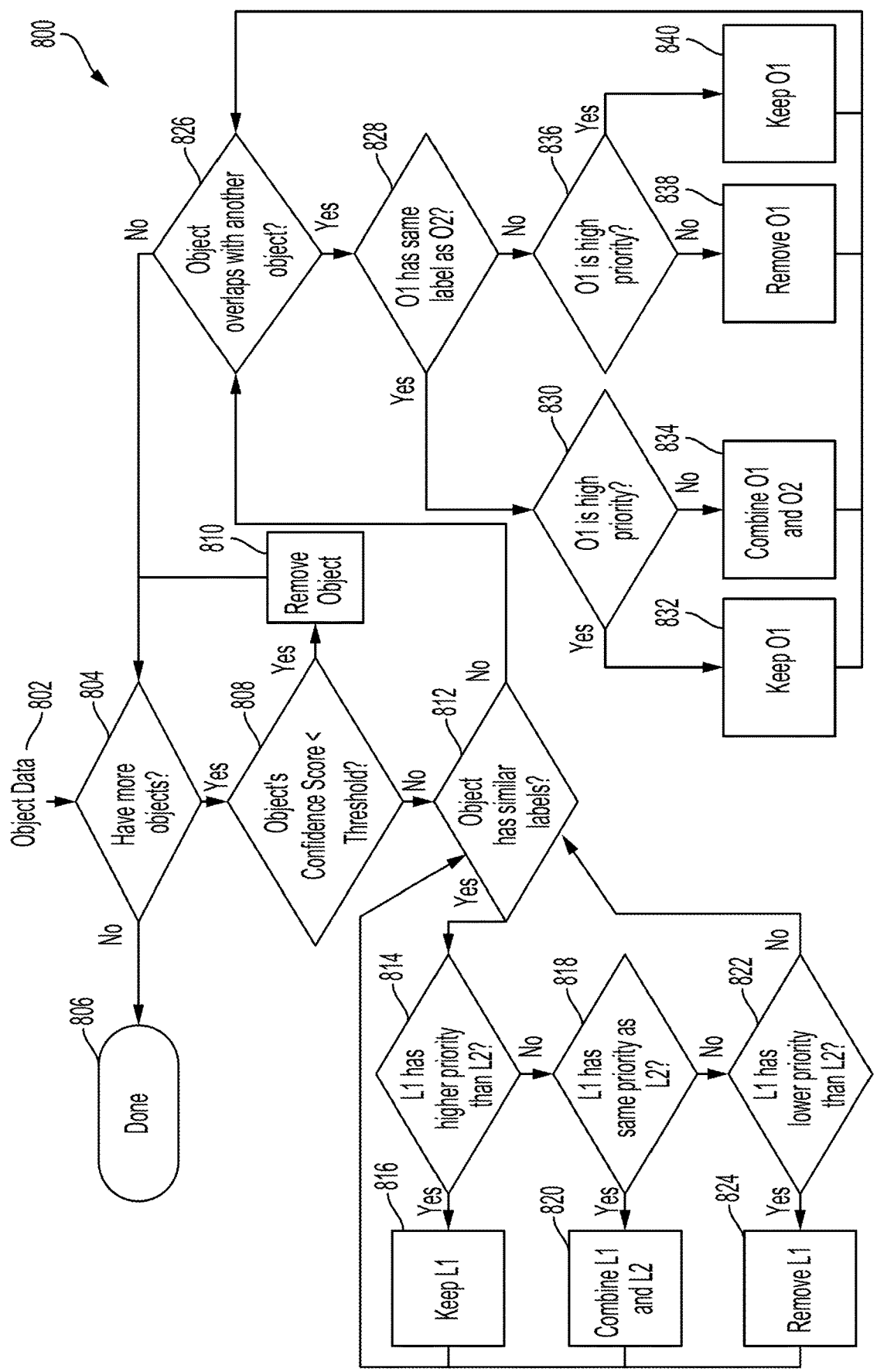
FIG. 8 includes a flowchart that illustrates an example of a process for filtering objects and labels to reduce the objects and labels.

FIG. 8 includes a flowchart that illustrates an example of a process 800 for filtering objects and labels to reduce the objects and labels to those that may be the most relevant to a user. The example process 800 can be implemented by a component of a content-aware selection system such as a content recognition engine. The process 800 can be invoked during processing of an image to identify the objects in the image. This processing can occur, for example, when the image is opened in an image editor. The process 800 can be implemented, for example, as instructions that can be executed by a processor.

The process 800 receives as input object data 802, which includes a list of objects, a bounding box for each object, one or more labels associated with each bounding box, and a confidence score for each object. The process 800 looks at each object in turn, thus, at step 804, the process 800 checks if there are any more objects to examine. When there are no more objects to examine, the process 800 proceeds to step 806, where the process 800 terminates.

When, at step 804, the process 800 has more nodes to examine, the process 800 proceeds to step 808. At step 808, the process 800 checks whether the object's confidence score is less than a threshold. The threshold can be set at 60%, 50%, or another value, and may be configurable at runtime. When the object's confidence score is less than the threshold, the process 800 proceeds to step 810, where the object is removed from the object data 802. When the object is removed, the bounding box and labels for the object are also removed.

When, at step 808, the object's confidence score is greater than or equal to the threshold, the process 800 proceeds to step 812. At step 812, the process 800 examines the set of labels for the object, and determines whether any are similar (e.g., either as synonyms or conceptually similar). When the labels include one or more that are similar, the process 800 iteratively compares the similar labels to each one another, starting at to step 814.

At step 814, the process 800 checks whether a first label (L1) has a higher priority than a second label (L2). The priorities can be determined from, for example, a lexical dictionary, which can provide labels that describe a class or category of objects, where the labels are ranked, for example, by frequency of usage among a population or another metric. When the first label has a higher priority than the second label, the process 800 proceeds to step 816 and determines to keep the first label. The first label is then removed from the group of similar labels, and the process 800 returns to step 812.

When, at step 814, the first label does not have a higher priority than the second label, the process 800 proceeds to step 818. At step 818 the process 800 checks whether the first label (L1) has the same priority as the second label (L2). In some examples, the labels may need to have priorities that are equal. In some examples, the labels can be within a range of one another (e.g., plus or minus 2-5 priority points, for example). When the labels have the same priority, the process 800 proceeds to step 820, where the first and second labels are combined into one label. The combined label is added to the group of similar labels, and the process 800 returns to step 812.

When, at step 818, the process 800 determines that the first label does not have the same priority as the second label, then the process 800 proceeds to step 822. At step 822, the process 800 determines whether the first label (L1) has a lower priority than the second label (L2). When the first label has a lower priority than the second label, then the process 800 proceeds to step 824, where the first label is marked for removal. The first label may not be removed yet at this point, in case the label is needed for further analysis. The first label is also removed from the group of similar labels, and the process 800 returns to step 812.

When, at step 822, the process 800 determines that the first label does not have a lower priority than the second label, the process 800 returns to step 812. At step 812, the process 800 can pick another two similar labels to compare, and can proceed again to step 814. When all the similar labels have been compared (including combined labels generated at step 820), the process proceeds to step 826.

At step 826, the process 800 determines whether the object overlaps with another object. This and subsequent steps can be used to handle situations when one object is recognized as multiple, smaller objects that should be treated as one object. For example, in the example image of FIG. 7, the girl's face has been identified as a separate object from the rest of the girl's body, and it may be that the girl's face and body should be treated as one object. Some overlap, however, may only be due to proximity of the objects to one another. For example, the dog's bounding box overlaps with the bounding box for the girl, and both objects should be treated as distinct.

The process 800 of FIG. 8 can determine overlap using the bounding boxes of the objects. In some examples, the test at step 826 may require that the degree of overlap be greater than a certain amount (e.g., greater than 30% or another threshold). When the object under consideration does not overlap with another object, or the degree of overlap is insufficient, the process 800 is done performing filtering on the object, and thus returns to step 804 to consider the next object.

Though not illustrated here, in some examples, the process 800 can consider additional factors when determining whether to proceed from step 826. For example, the process 800 can consider the relative sizes of the objects (based on the respective bounding box sizes). In this example, when one overlapping object is much smaller than the other overlapping object (as measured, for example, by comparing a ratio of the sizes to a threshold), it may be that the smaller object is a part of the larger object, and should be combined with the larger object. But when the objects are comparable in size, then it may be that the objects are different objects. In the former case, the process 800 can proceed with the analysis that starts at step 828. In the latter case, the process 800 can treat the objects as non-overlapping, and can proceed to step 804.

At step 828, the process 800 checks whether the object under consideration (O1) has a same label as does the overlapping object (O2). The labels can be identical, synonyms, or conceptually similar. The labels can be at different locations within a label vector for each object. When the objects have a same label, the process 800 proceeds to step 830.

At step 830, the process 800 determines whether the object under consideration (O1) is a high priority object. The process 800 can determine the object's priority from the object's label or labels, and a lexical dictionary that may rank words according to the usage of these words in a population. The lexical dictionary may indicate that, though the object under consideration is possibly a part of a larger object, the object is frequently referred to independently of or in conjunction with the entire object. To be considered high priority, the object's label or labels may need to be greater than a threshold value.

When the object is high priority, the process 800 proceeds to step 832, where the process determines to keep the object as a distinct object. At this step, the process 800 may associate the object under consideration with the overlapping object. For example, the process 800 may assign to the object a label from the overlapping object, such as the most specific label, if the object does not already have this label. In this example, the additional label can enable the content-aware selection system to locate the object as a separate object from the larger object. After step 832, the process 800 is done with the object, and proceeds to step 804 to consider the next object.

When, at step 830, the process 800 determines that the object under consideration is not a high priority object, the process 800 proceeds to step 834. At step 834, the object under consideration (O1) is combined with the object with which it overlaps (O2). Combining can include expanding the bounding box of or the other object to include the regions of both objects. In some examples, combining can also include combining the unique labels of each object and removing duplicate labels. Once the combining is complete, one of the bounding boxes (e.g., the smaller bounding box) can be removed, and the object associated with the bounding box can be removed from the object data 802.

When, at step 828, the process 800 determines that the object under consideration (O1) does not have a same label as an object with which it overlaps (O2), the process 800 proceeds to step 836. Step 836 may be reached because the overlapping objects are not part of the same object, or because one object may be distinct but unrelated to the other object (e.g., a graphic element printed on a T-shirt, glasses on a person's face, a tool held in a person's hand, etc.). In such cases, it may be that one object should be removed, or the objects should be combined.

At step 836, the process 800 determines whether the object under consideration (O1) is a high priority object. As at step 830, the object's priority can be determined using a lexical dictionary and threshold. At step 836, the process 800 can consider other factors as well, such as the relative sizes of the objects, degree of overlap, relative locations (e.g., where is one object located with respect to the other), and other factors.

When, at step 836, the process 800 determines that the object under consideration is not high priority, then the process 800 can proceed to step 838, where the object (O1) is removed from the object data 308, along with the object's bounding box and labels. The process 800 then returns to step 804 to consider the next object. When, at step 836, the process 800 determines that the object under consideration is a high priority object, then, at step 840, the process 800 determines to keep the object. The process 800 then returns to step 804 to consider the next object.

The output of the process 800 is the object data 802, possibly with some objects removed or combined and some labels removed or combined. The reduced object data 802 may reflect the objects that are most relevant to a user.

The process 800 provides just one example of a process that can be used by a content-aware selection system to filter objects and labels. In various examples, other or similar processes can be used, which use similar or different criteria when determining whether to keep, remove, or combine an object with another or to keep, remove or combine labels.

Figure 9:
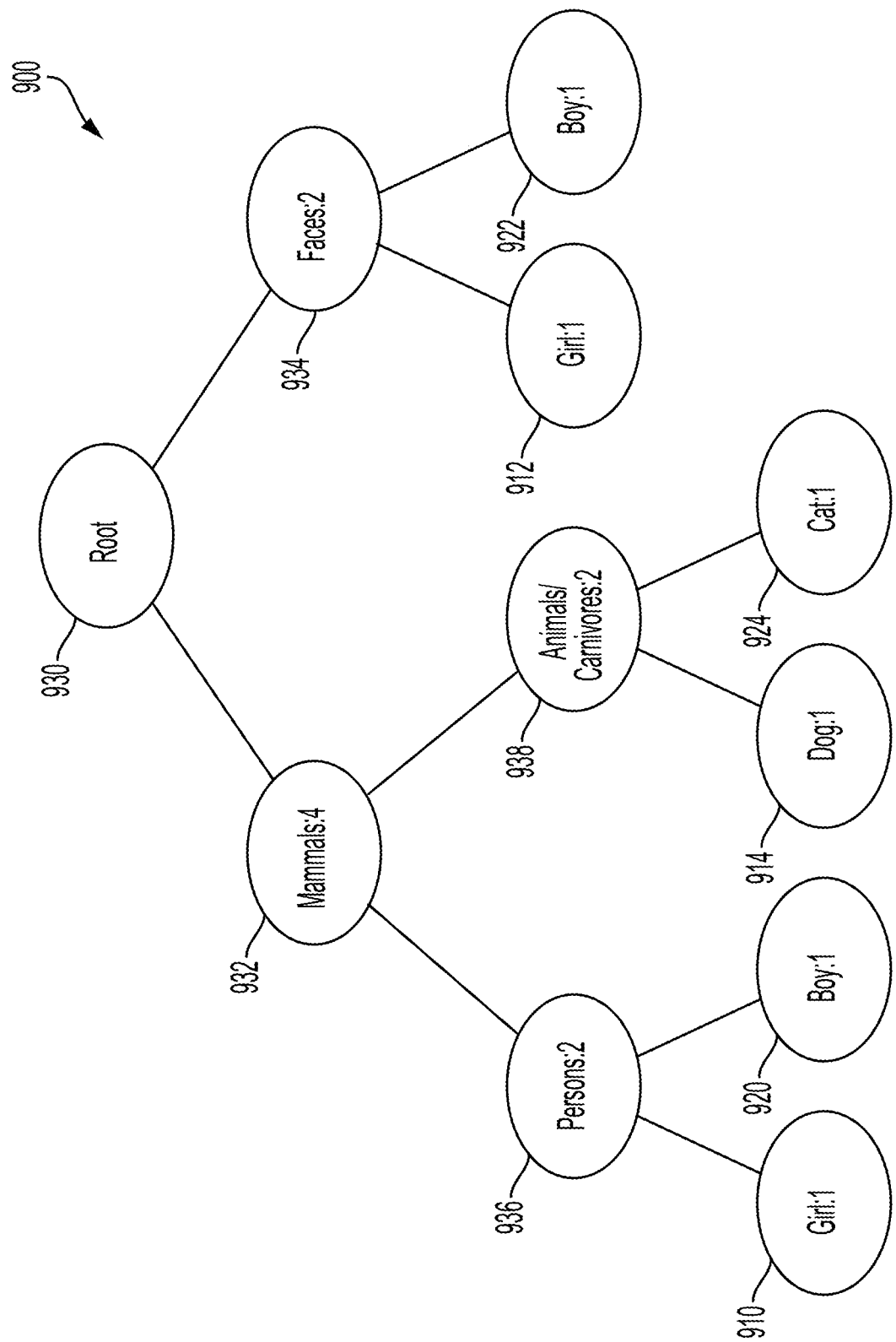
FIG. 9 includes a diagram that illustrates an example relationship tree.

The object data produced by the process 800 of FIG. 8 can next be used to determine relationships between the objects in an image. FIG. 9 includes a diagram that illustrates an example relationship tree 900. A relationship tree such as is illustrated in FIG. 9 can be used by the content-aware selection system to identify groups of objects, and to enable a user to select more than one object at a without needing to select each object. The relationship tree 900 can be generated by a content recognition engine of the content-aware selection system, for example.

The relationship tree 900 of FIG. 9 was generated from the labels and bounding boxes illustrated in the example image of FIG. 7. The relationship tree 900 includes an arrangement of super-nodes and sub-nodes, where each node has a label and a count. The label at any particular node is a super-category or class that encompasses the labels of each of the node's sub-nodes. The leaf nodes refer to a specific object, and may include a reference or pointer to the object's data (e.g., the object's bounding box).

The first or topmost node in the relationship tree 900 is a root node 930, which can be used to refer to and select all objects in the image. The sub-nodes of the root node 930 are a first node with the label "Mammals" (e.g., a "Mammals" node 932) and a second node with the label "Faces" (e.g., a "Faces" node 934). The "Mammals" node 932 has a count equal to 4, which includes each of the leaf nodes below this node. The "Faces" node 934 has a count of 2 for each of the leaf nodes below this node. The sub-nodes of the "Faces" node 934 include a node with the label "Girl" (e.g., a first "Girl" node 912) and a node with the label "Boy" (e.g., a first "Boy" node 922) for each of the faces that were detected in the image, and each having a count of 1.

The sub-nodes of the "Mammals" node 932 include a node with the label "Persons" (e.g., a "Persons" node 936) and a node with the label "Animals/Carnivores" (e.g., an "Animals/Carnivores" node 938). The "Persons" node 936 encompasses the boy and the girl in the image, and thus has a count of 2 and a sub-node for each (e.g., a second "Girl" node 910 and a second "Boy" node 920 each having a count of 1). The "Animals/Carnivores" node 938 encompasses the dog and the cat, and thus has a count of two and a sub-node for each (e.g., a "Dog" node 914 and a "Cat" node 924 each having a count of 1).

The relationship tree 900 illustrated in FIG. 9 is specific to the example image discussed above. For other images, the nodes illustrated as leaves may be super-nodes whose labels encompasses multiple other nodes. For example, an alternate example image can include two girls instead of one. In this example, the "Girl" node 910 would have a count of 2, and would have two sub-nodes. The sub-nodes could have labels such as "Girl1" and "Girl2" for example. Additionally, the count at the "Persons" node 936 and the "Mammals" node 932 would each be increased by one.

In the example of FIG. 9 it should also be noted that the "Persons" node 936 is included as a sub-node to the "Mammals" node 932, but that "Mammals" is not one of the labels for either the girl or the boy objects. As discussed in further detail below, when the relationship tree 900 is generated, the "Persons" label may be classified as a subcategory of "Mammals," and thus be added in a sub-node to the "Mammals" node 932. In various examples, this arrangement can enable the user to select all of the girl, boy, dog, and cat at one time. In other examples, an object is placed in a relationship tree only based on the labels associated with the object.

Figure 10:
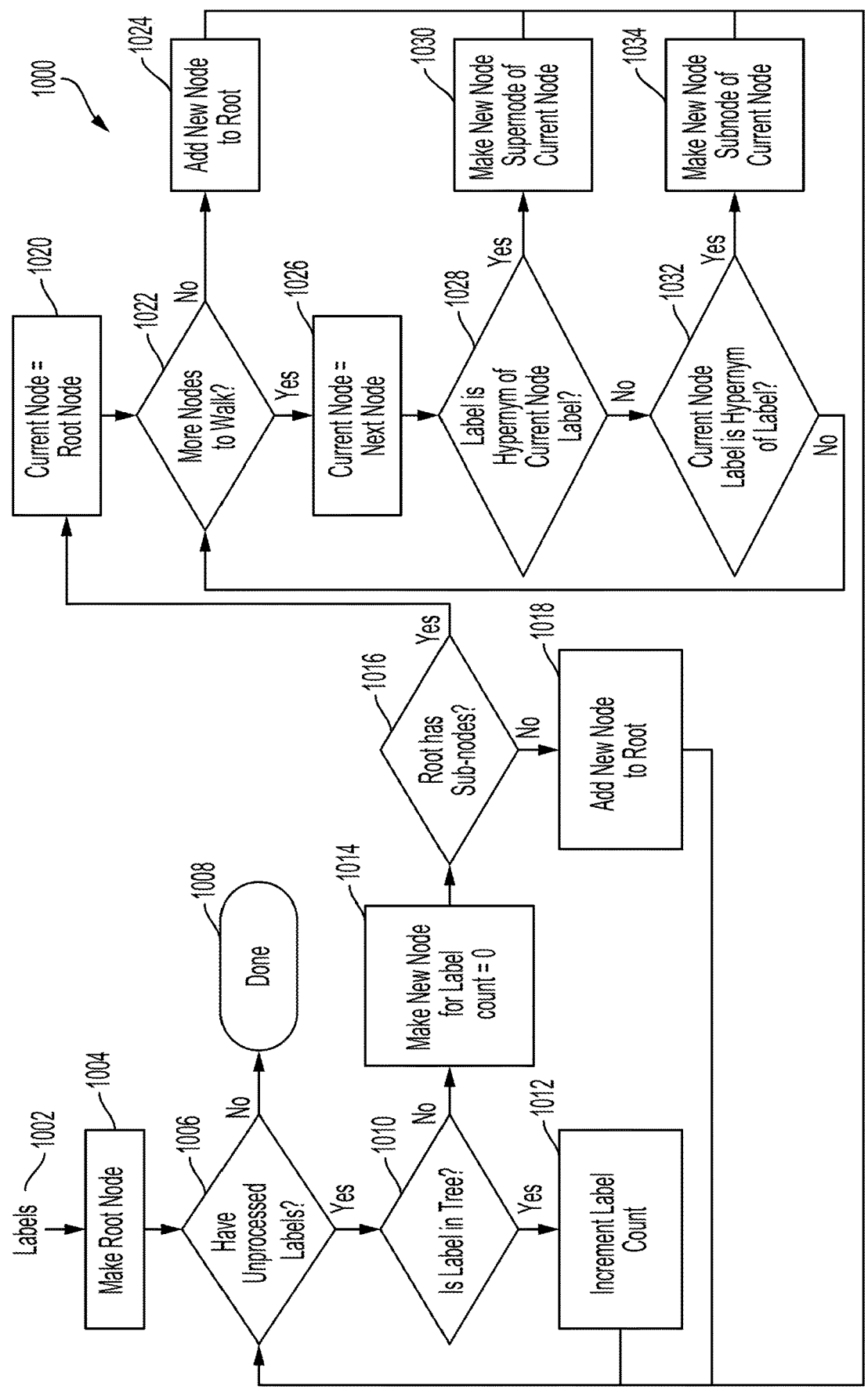
FIG. 10 includes a flowchart illustrating an example of a process for generating a relationship tree.

FIG. 10 includes a flowchart illustrating an example of a process 1000 for generating a relationship tree. The example process 900 can be implemented by a component of a content-aware selection system such as a content recognition engine. The process 1000 can be invoked during processing of an image to identify the objects in the image. This processing can occur, for example, when the image is opened in an image editor. The process 1000 can be implemented, for example, as instructions that can be executed by a processor.

The process 1000 receives as input labels 1002 for objects that were detected in an image. The labels 1002 can be only the unique labels from among all the labels, or can be all labels for all objects. In some examples, the set of labels for each object are input, one set at a time, into the process 1000.

At step 1004, the process 1000 generates a root node. The root node serves as the top of the relationship tree. The root node may lack a label, or may have the label "All" or another label that designates all of the detected objects.

The process 1000 next examines of the input labels 1002. Thus, after generating the root node, the process 10000 proceeds to step 1006, where the process 1000 determines whether any of the input labels 1002 have not yet been processed. When all have been looked at, the process 1000 proceeds to step 1008, where the process 1000 terminates.

When, at step 1006, the process 1000 determines that unprocessed labels remain, the process 1000 selects an unprocessed label and proceeds to step 1010. At step 1010, the process 1000 checks whether the label is already in the relationship tree. The process 1000 can make this determination, for example, by examining each of the nodes in the relationship tree in turn, and check whether the node's label matches the label being examined. Alternatively, the process 1000 can keep a separate list of labels that have already been added to the relationship tree, and can check the current label against this list. When the relationship tree already has a node with the label, the process 1000 proceeds to step 1012, where the label counter for the node is incremented by one. The process 1000 then returns to step 1006 to process the next label.

When, at step 1010, the process 1000 determines that no existing node in the relationship tree has the label being examined, the process 1000 proceeds to step 1014. At step 1014, the process 1000 generates a new node, and assigns the label to the new node. Additionally the new node's label counter is set to zero.

The process 1000 next proceeds to step 1016, where the process 1000 checks whether the root node has any sub-nodes. When the root node does not yet have any sub-nodes, the process 1000 proceeds to step 101, and adds the new node (generated at step 1014) as a sub-node of the root node. The process 1000 then returns to step 1006 to process the next label.

When, at step 1016, the process 1000 determines that the root node already has sub-nodes, the process 1000 then proceeds to step 1020 to walk the relationship tree and find an appropriate place for the new node. At step 1020, the process 1000 sets a current node (which can be a pointer or a reference to another node) equal to the root node, and proceeds to step 1022.

At step 1022, the process 1000 checks whether there are more nodes to be walked. This test can include determining whether the current node has any sub-nodes and, if so, whether each of the sub-nodes has been looked at. When the current node has no sub-nodes, or all of the sub-nodes have been examined, then step 1022 can include moving back up the tree, and setting the current node equal to a super-node. For example, the current node can be set to the super-node of the current node, and the test for whether the updated current node has sub-nodes left to be examined can be repeated. When no sub-nodes are left to be examined, the current node can be set again to the super-node of the current node, and the test repeated until the current node is equal to the root node. At this point, the process 1000 will have checked each node in the relationship tree, and found no node that matches the label being considered. This can occur, for example, when the label represents a new class of object that is not yet part of the relationship tree. The process 1000 thus proceeds to step 1024 to add the new node as a sub-node of the root node 1024, and then returns to step 1006 to consider the next label.

Returning to step 1022, the process 1000 determines that there are more nodes to walk when the process 1000 finds a node that has sub-nodes that have not yet been looked at. In this case, the process proceeds to step 1026, and sets the current node to the next node of the sub-nodes that have not yet been examined.

The process 1000 then proceeds to step 1028, where the process 1000 tests whether the label being considered is a hypernym or super-category of the label of the current node. To make this determination, the process 1000 can use a lexical dictionary that classifies nouns for similar objects into categories. For example, if the label being considered is "Animal" and the label of the current node is "Dog," then the test at step 1028 will return "Yes." In this example, the process 1000 will proceed to step 1030, and make the new node (generated at step 1014) the super-node of the current node; that is, the current node's connection with its super-node will be broken and the new node inserted as the super-node of the current node and the sub-node of the current node's former super-node. A suitable place or the current label has thus been found, and the process 1000 returns to step 1006 to consider the next label.

When, at step 1028, the process 1000 determines that the label is not a hypernym of the label at the current node, the process 1000 then proceeds to step 1032. At step 1032, the process 1000 tests whether the label at the current node is a hypernym of the label being considered (e.g., the inverse of the test at step 1028). As an example, the label for the current node can be "Dog" while the label being considered is "Beagle." In this example, the process 1000 will proceed to step 1034, and make the new node (generated at step 1014) a sub-node of the current node. The process 1000 then returns to step 1006 to consider the next label.

In some examples, the test at step 1032 is only performed when the current node is a leaf node, or after also testing the sub-nodes of the current node, to avoid cases where a branch of the relationship tree has multiple hypernyms. For example, a "Beagle" is both an "Animal" and a "Dog," and if the "Animal" label is encountered first, the "Beagle" label should not be erroneously inserted between "Animal" and "Dog."

When, at step 1032, the label at the current node is not a hypernym of the label being considered, a suitable place for the label has not yet been found, and the process 1000 returns to step 1022 to keep looking.

The output of the process 1000 is a relationship tree such as is illustrated in FIG. 9. In some examples, each node in the tree can include a reference to the objects (along with the object's bounding boxes and labels) described by the label at the node. Alternatively or additionally, the data for the objects can be stored in a separate data structure or set of data structures.

The process 1000 illustrates one example technique for determining a relationship tree, and other techniques can be used, which may result in different relationship trees. For example, when the objects have a label vector, the labels in the vector may be arranged in order of most specific to most general, or most general to most specific. In this example, the content-aware selection system can use the order of the labels to generated the relationship tree, without needing to determine hypernyms. Using the labels indicated in FIG. 7 as an example, for the first bounding box 710, the a process can add a node for "Person" to a root node, and then add a node for "Girl" as a sub-node to the "Person" node. For the second bounding box 712, the process can add a node for "Face" to the root node, and add a node for "Girl" as a sub-node to the "Face" node. For the third bounding box 714, the process can add a node for "Mammal" to the root node, a node for "Animal/Carnivore" as a sub-node to the "Mammal" node, and a node for "Dog" as a sub-node for the "Animal/Carnivore" node. For the third bounding box 720, the process will find "Person" already present as a node under the root node, but will not find "Boy," and thus can add a node for "Boy" as a sub-node to the "Person" node. The process will also find "Face" as a node under the root node, and will add a node for "Boy" under the "Face" node. For the sixth node, the process will find each of "Mammal" and "Animal/Carnivore" present in the relationship tree, and thus only need to add "Cat" as a sub-node to the "Animal/Carnivore" node.

The preceding is just one example of an alternate process that can be used to generate the relationship tree. Other processes are possible.

Figure 11:
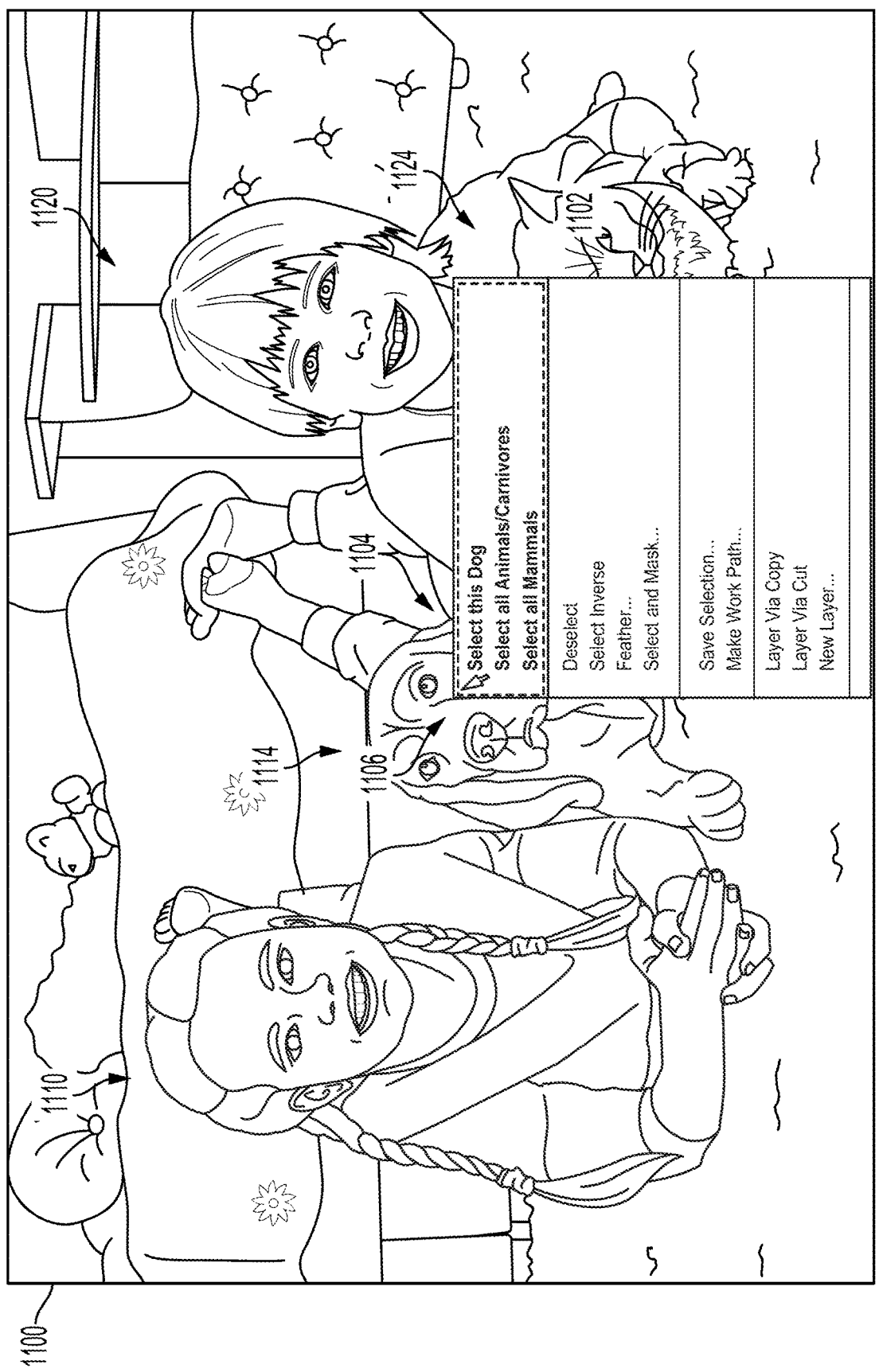
FIG. 11 illustrates a screenshot of the example image.

As noted above, the relationship tree and the data about the objects can be used in various ways by an image editor. FIG. 11 illustrates a screenshot 1100 of the example image, where the screenshot 1100 may have been taken while the image 1100 was open in the user interface of an image editor. The screenshot 1100 thus reflects what the user may see. In the example of FIG. 11, the user has selected on the dog 1114, which cause the image editor to generate an onscreen menu 1102. Selecting the dog 1114 means that, for example, the user placed a mouse pointer at a location 1106 within the bounding box (which is not shown here) for the dog and clicked a right mouse button (or button mapped to the same function) while the mouse pointer was at the location 1106. Alternatively, as another example, the user may have tapped a stylus on a touch screen or digitizing tablet, possibly while holding down a button. Alternatively, the user may have tapped a finger or other capacitive object on a touch screen, or tapped and held the finger in at the location 1106, or double-tapped at the location 1106, or performed another type of input. In each of these examples, the user's input was interpreted as a request for the onscreen menu 1102, which may also be referred to as a context menu or pop-up menu.

In the example of FIG. 11, the user's input may have been received while a content-aware selection tool was enabled. As a result, the image editor has populated the onscreen menu 1102 with a selection options list 1104 that was generated using object data, derived at an earlier time or when the user's input was received. In the illustrated example, the first selection option in the selection options list 1104 is "Select this Dog" because the selected location 1106 is squarely within the bounding box for the dog, 1114. If the image had more than one dog, the content-aware selection system may next have added the option "Select all Dogs," however, this label is omitted due to there being only one dog in the image.

The selection options list 1104 next has the option "Select all Animals/Carnivores" because the content-aware selection system has determined the label "Animals/Carnivores" as a hypernym of the label "Dog," and because there is more than one object in the image that falls under the "Animals/Carnivores" label (e.g., the cat 1124). The selection options list 1104 next includes the option "Select all Mammals" because the image includes more than one object determined to be a mammal (in addition to the dog 1114, the girl 1110, the boy 1120, and the cat 1124).

In another example, the location 1106 may have fallen where the bounding boxes for the dog 1114 and the girl 1110 overlap. In this example, the selection options list 1104 can also include the option "Select this Girl" before or after "Select this Dog." The selection options list 1104 may possibly also include "Select all Persons" because the content-aware selection system determined that "Person" is a hypernym for "Girl" and because there is more than one person in the image (e.g., the boy 1120).

In another example, the location 1106 may be outside of any bounding box. In this example, the content-aware selection system may select the nearest bounding box or boxes. For example, when the content-aware selection system determines that the location 1106 is at a located with a threshold distance from the edge of a bounding box, then the content-aware selection system can select the bounding box.

When the content-aware selection system determines that no bounding boxes are associated with the location 1106, then the content-aware selection system can take on of several alternative actions. For example, the content-aware selection system can assume that all the bounding boxes are relevant, and can add a "Select All" option to the selection options list 1104. Alternatively, the content-aware selection system can populate the selection options list 1104 with a hierarchical list of all the available labels. As another example, the content-aware selection system can populate the selection options list 1104 with the option to select everything but the identified objects (e.g., the option "Select all except Girl, Boy, Dog, Cat" or something similar). In this example, the content-aware selection system can generate a selection area that is the inverse of the selection area generated when all of the objects are selected. As another example, the content-aware selection system may determine that nothing is selectable, and thus may provide single, non-selectable option that says "None" or something similar.

The onscreen menu 1102 further includes other options that are related to generating or working with selection areas.

Figure 12:
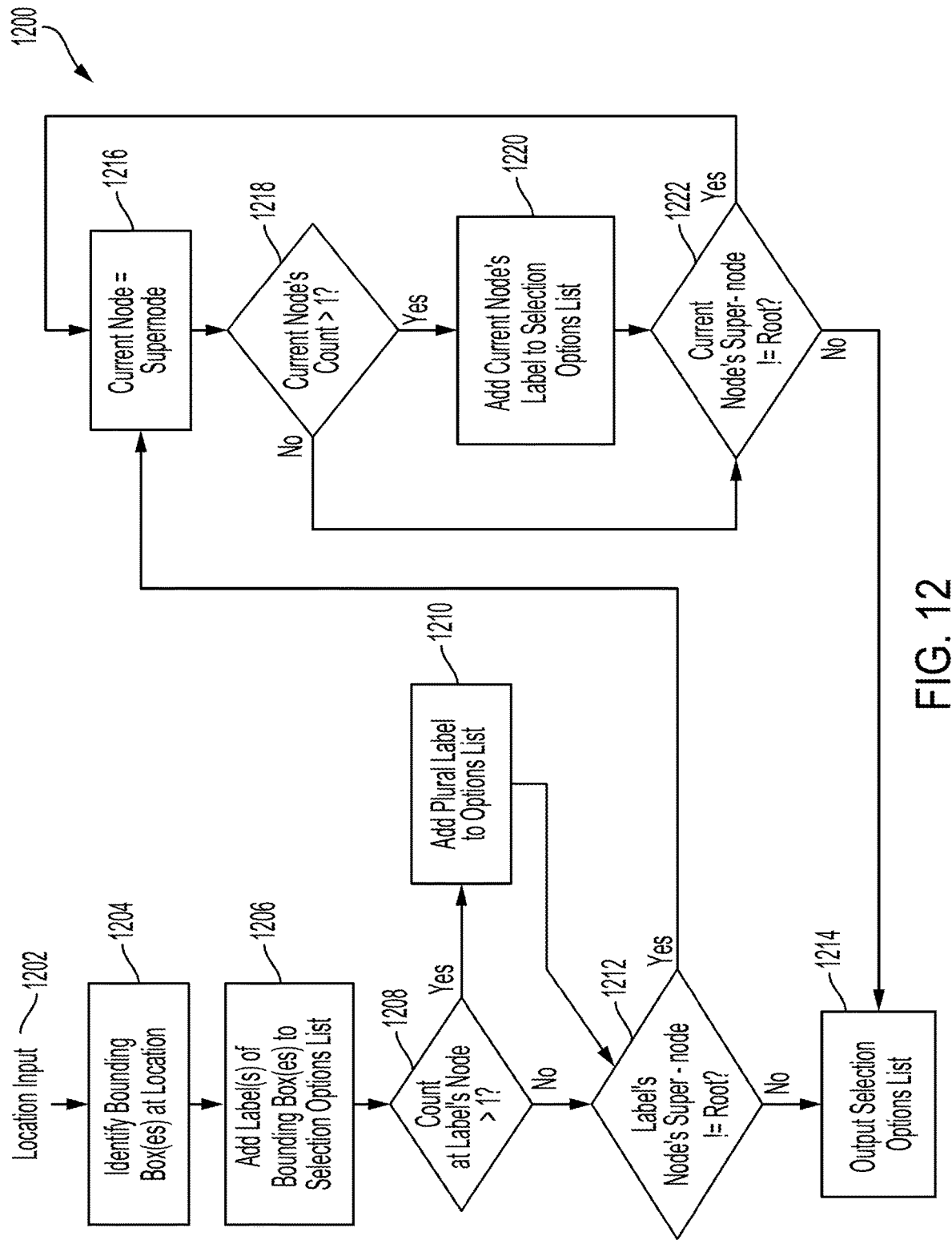
FIG. 12 includes a flowchart of an example process that the content-aware selection system can perform in determining the items for a selection options list.

FIG. 12 includes a flowchart of an example process 1200 that the content-aware selection system can perform in determining the items for a selection options list. The example process 1200 can be implemented by a component of the content-aware selection system, such as a content selection engine. The process 1200 may be invoked while a user is editing an image using the user interface for an image editor. The process 1200 can be implemented, for example, as instructions that can be executed by a processor.

The process 1200 receives location input 1202, generated when the user performs an action that results in a pixel location or group of pixel locations being selected. The location can be identified using pixel coordinates (e.g., a horizontal coordinate and a vertical coordinate), for example. The process 1200 may also have access to object data, which can include a list of identified objects, the bounding boxes for the objects, one or more labels associated with the bounding boxes, and a relationship tree for the labels. The object can be determined in advance of the process 1200 being invoked.

At step 1204, the process 1200 identifies one or more bounding boxes that are at the location indicated by the location input 1202. A bounding box is identified at step 1204 when the region enclosed by the bounding box includes the location. To determine whether a bounding box is identified by the location, the process 1200 can, for example, check each bounding box for each object identified in the image to see if the location is within the horizontal and vertical range of pixels enclosed by the bounding box. When more than one bounding box encompasses the location, each of the bounding boxes are included in a list of identified bounding boxes. Alternatively or additionally, at step 1204, a bounding box can be identified by being near the location. For example, the process 1200 can identify a bounding box that is within a distance of n pixels from the location indicated by the location input 1202, where n may be configurable at runtime. In this example, it may be possible that more than one bounding box is within n pixels of the location, in which case each bounding box will be added to the list of identified bounding boxes.

At step 1206, the labels of the bounding boxes identified at step 1204 are added to a selection options list. In some examples, each bounding box has only one label, which are each added at step 1206 to the selectin options list. In some examples, a bounding box may have more than one label, and each label may be added to the list or only the most specific label may be added.

The process 1200 next looks for or generates any additional labels that are related to the labels that have so far been added to the selection options list. The additional labels can be more general descriptions (e.g., broader categories) of the labels already in the selection options list, and are added to the selection options list when the image includes other objects that can be described by these additional labels.

To determine the additional labels, the process 1200 can examine the nodes in a relationship tree such as is illustrated in FIG. 9. At step 1208 of FIG. 12, for each label added to the selection options list 1104 at step 1206, the process 1200 looks at the node in the relationship tree for the label. As discussed above, the node can include a count of the number of sub-nodes below the node. When the count is greater than one (one indicating the node itself), then the content-aware selection system 212 has identified more than one object that can be described by the label of the node. For example, the node's label may be "Dog," and the node may have a count of two that indicates that two people were identified in the image. In such cases, the process 1200 proceeds to step 1210, where the process 1200 generates a plural version of the label, and adds the plural label to the selection options list 1104. From step 1210, the process 1200 next proceeds to step 1212.

When, at step 1208, the process 1200 determines that a label's node count is equal to one, the process 1200 also proceeds to step 1212, where the process 1200 walks the relationship tree to find super-category labels that can be added to the selection options list. At step 1212, the process 1200 checks whether the node for a label being considered has a super-node that is not the root node. When the node's super-node is the root node, then the node's label is a broadest category label in the relationship tree, and the content-aware selection system found no broader labels for describing the label. The process 1200 thus proceeds to step 1214, and outputs the selection options list.

When, at step 1212, the process 1200 determines that the node has a super-node that is not the root node, the process 1200 proceeds to step 1216. At step 1216, the process 1200 sets a current node (e.g., a pointer or reference) equal to the super-node. The process 1200 then proceeds to step 1218, where the process 1200 checks whether the current node's count is greater than one, which indicates that more than one object in the image can be described by the label at the current node. When the count is greater than one, the process 1200 proceeds to step 1220, and adds the current node's label to the selection options list. The process 1200 proceeds to step 1222.

When, at step 1218, the process 1200 determines that the current node's count is not greater than one, the process 1200 also proceeds to step 1222. At step 1222, the process 1200 checks whether the current node's super-node is a node other than the root node. When the super-node is not the root node, the process returns to step 1216, where the process 1200 proceeds up the relationship tree by one more node.

When, at step 1222, the process 1200 finds that the current node's super-node is the root node, the process 1200 has found all possible super-categories, and thus proceeds to step 1214.

The output of the process 1200 is the selection options list, which can be used in various different ways. For example, the user interface of an image editor can generate an onscreen menu, and populate the onscreen menu with the selection options list.

The process 1200 is one example of a process a content-aware selection system can perform in determining labels that may be relevant to a user when the user provides location input 1202. The content-aware selection system can perform similar or different processes based on the location input 1202, or when receiving different kind of input. For example, the content-aware selection system can perform a similar or different process when the location input does not correspond to any bounding box. As another example, the content-aware selection system can perform a similar or different process when receiving voice input.

Figure 13:
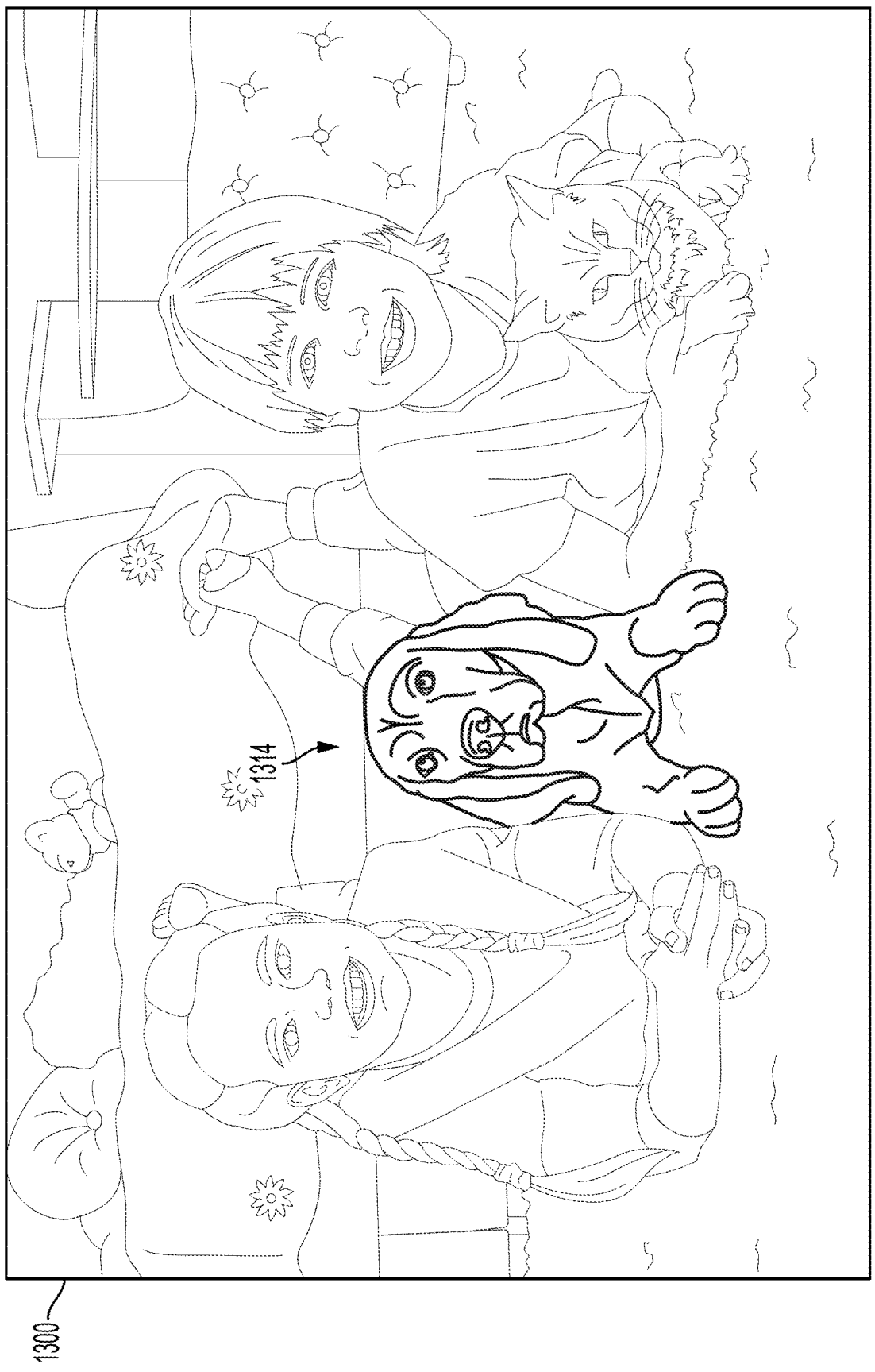
FIG. 13 includes an example image that illustrates a representation of a selection area that can be generated by a content-aware selection system.

FIG. 13 includes an example image 1300 that illustrates a representation of a selection area that can be generated by a content-aware selection system. The image 1300 of FIG. 13 is intended to show an example of selection area, and may not reflect a literal image that is seen by the user. In the example image 1300, the pixels that represent the dog 1314 have been included in the selection area, while all pixels identified as likely not part of the dog 1314 have been excluded. Pixels outside the selection area are illustrated in this example by being greyed out.

The content-aware selection system automatically generated the selection area illustrated in the image 1300 based on identification of the dog 1314 by the user. For example, the user may have clicked or tapped on the dog 1314 while a content-aware selection tool was enabled. As another example, the user may have clicked or tapped on the dog 1314 to request an context menu, which the content-aware selection system populated with one or more labels for the dog. In this example, selecting the label for the dog can result in the content-aware selection system generating the selection area illustrated in FIG. 13. As another example, when an image editor supports voice commands, the user can provide a voice command such as "select the dog."

Figure 14:
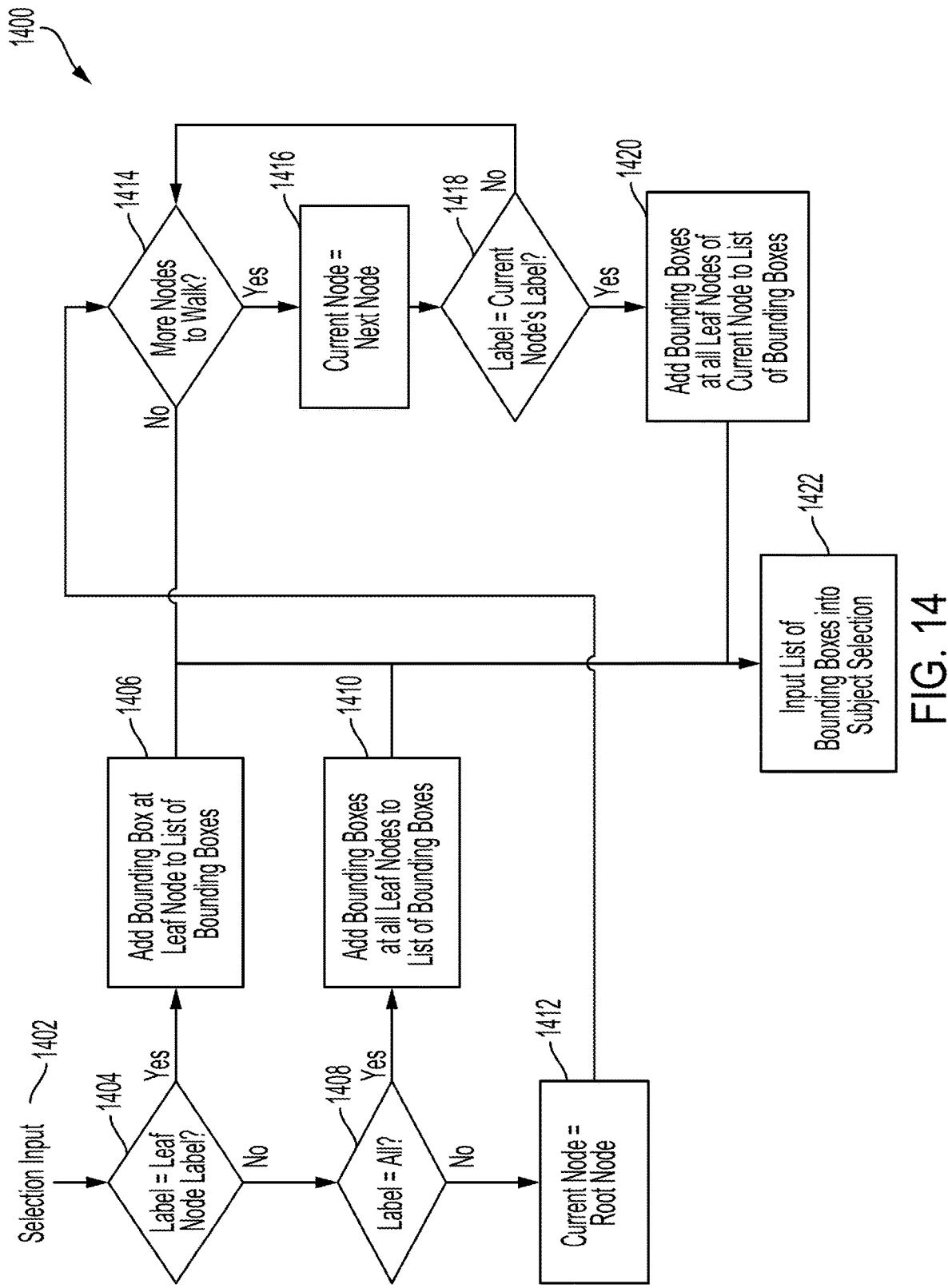
FIG. 14 includes a flowchart that illustrates an example of a process that the content-aware selection system can perform to generate a selection area.

FIG. 14 includes a flowchart that illustrates an example of a process 1400 that the content-aware selection system can perform to generate a selection area. The example process 1400 can be implemented by a component of the content-aware selection system, such as a content selection engine.

The process 1400 may be invoked while a user is editing an image using the user interface for an image editor. The process 1400 can be implemented, for example, as instructions that can be executed by a processor.

The process 1400 receives selection input 1402, which can include a label. The selection input 1402 may be in the form of selection (e.g., clicking or tapping) of a location within the image being edited. Alternatively, the selection input 1402 can be derived from an onscreen menu. For example, the image editor can provide a label when the user selects the label from a list on an onscreen menu. Alternatively, the selection input 1402 can be derived from voice input. For example, an audio processing component can perform speech-to-text, and the image editor can extract a label from the text. The process 1400 can also have access to object data for the image, including bounding boxes, labels associated with the bounding boxes, and a relationship tree for the labels.

At step 1404, the process 1400 determines whether the label provided in the selection input 1402 is the label of a leaf node in the relationship tree. As discussed above, leaf nodes in the relationship tree are associated with specific objects, rather than categories of objects. Thus, when the label is for a leaf node, then the label identifies a specific object for inclusion in the selection area. When the label is for a leaf node, then the process 1400 proceeds to step 1406. At step 1406, the process 1400 adds the bounding box associated with the leaf node to a list of bounding boxes, where bounding boxes in the list are for objects that are to be included in the selection area.

Step 1406 was reached because the selection input 1402 specified one specific object. Thus, the process 1400 next proceeds to step 1422, wherein the list of bounding boxes is input into a subject selection tool.

Returning to step 1404, when the label indicated by the selection input 1402 is not for a leaf node, then the label specifies more than one object. The process 1400 thus proceeds to step 1408. At step 1408, the process 1400 checks where the label specifies all objects. The label may be the string "All" or "Root" (designating the root node of the relationship tree), or something similar. When the 1400 determines that the label specifies all objects, the process 1400 proceeds to step 1410, where the process 1400 adds the bounding boxes at all leaf nodes to the list of bounding boxes. The process 1400 then proceeds to step 1422.

Returning to step 1408, when the label does not specific all the objects, then the process 1400 will determine which objects are described by the label by walking the relationship tree. The process 1400 first proceeds to step 1412, and sets a current node (e.g., a pointer or reference) equal to the root node. The process 1400 then proceeds to step 1414.

At step 1414, the process 1400 check whether there are more nodes in the relationship tree that have not yet been walked to. This step can include, for example, determining whether any sub-nodes of the current node have been looked at yet, and adding any that have not been looked at to a list of nodes to look at. As another example, when all the sub-nodes of the current node have been looked at, this step can include checking if the super-node of the current node has any sub-nodes that have not yet been looked at, and if so, adding these sub-nodes to the list of nodes to examine. When the super-node of the current node also does not have any sub-nodes that have not been examined, the process 1400 can continue looking up the relationship tree until the root node is reached, at which point the process 1400 determines that there are not more noes to walk. When the process 1400 determines that there are no more nodes to walk to, then the process 1400 proceeds to step 1422.

When, at step 1414, the process 1400 determines that there are more nodes to walk to, the process 1400 then proceeds to step 1416, where the process 1400 sets the current node equal to a next node, where the next node is taken from a list of nodes that have not yet been examined (e.g., sub-nodes of the previous current node, or sub-nodes of another node). The process 1400 then proceeds to step 1418, where the process 1400 tests whether the label indicated in the selection input 1402 is equal to the label for the current node. When the label does not match the label of the current node, then the category of objects described by the label has not yet been found. The process 1400 thus returns to step 1414 to find the next node to check (if any).

When, at step 1418, the label indicated by the selection input 1402 does match the label of the current node, the category of objects described by the label has been found. The process 1400 thus proceeds to step 1420. At step 1420, the process 1400 finds all the leaf nodes below the current node, and adds the bounding boxes associated with each of the leaf nodes to the list of bounding boxes. The process 1400 then proceeds to step 1422.

At step 1422, the process 1400 uses each of the bounding boxes in the list of bounding boxes to identify a set of pixels in the image that are described by the bounding box. The set of pixels may be a rectangular region of the image, and may be less than all the pixels in the image. The process 1400 then inputs the set of pixels into a subject selection tool. The subject selection tool can use various techniques for identifying pixels associated with the most prominent object in the set of pixels. The subject selection tool can use, for example, a neural network that has been trained for identifying objects. In this example, the subject selection tool can attempt to match the set of pixels against various categories of objects that the neural network was trained to identify, and can further use a match to identify pixels that are part the object versus pixels that are not part of the object. In this example, the prominence of an object can be determined from classification probabilities output by the neural network, with the object having the highest probability of having been correctly identified being selected as the most prominent. Because the set of pixels input into the subject selection tool includes primarily the pixels of one object, the subject selection tool will identify the one object as the most prominent.

The output of the subject selection tool is a selection area. When more than one bounding box is input into the subject selection tool, the subject selection tool can generate a selection area for each. In this case, the process 1400 can also include combining the multiple selection areas into a single selection area.

Figure 15:
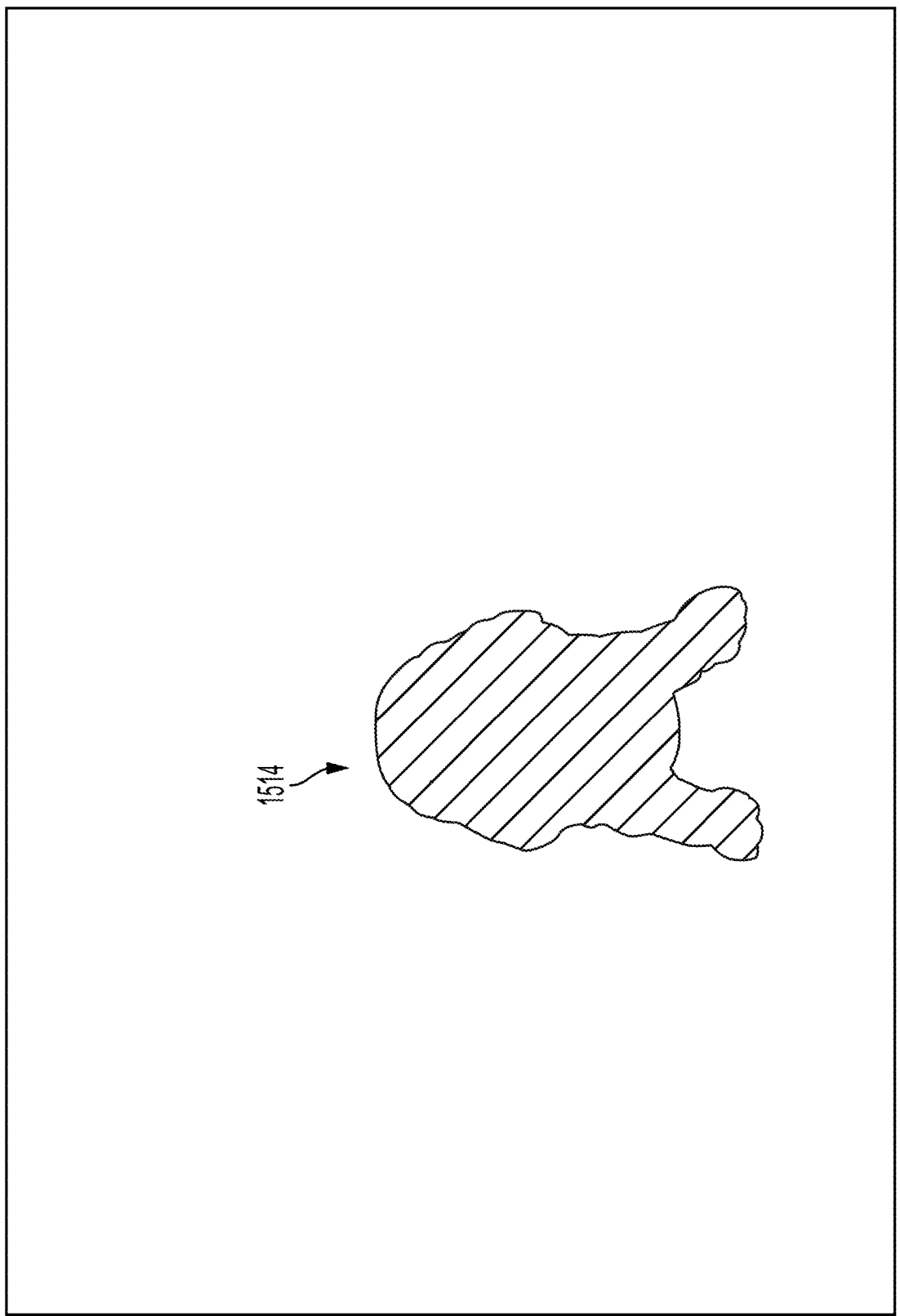
FIG. 15 includes an illustration of a mask generated from the selection area illustrated in FIG. 13.

A selection area generated by a content-aware selection system can be used in various ways, including in the same ways that selection areas generated by other selection tools can be used. For example, the selection area can be used to generate a mask. FIG. 15 includes an illustration of a mask 1500 generated from the selection area illustrated in FIG. 13. A mask enables part of an image to be "hidden" or made unmodifiable while the remaining part of the image can be manipulated. When combined with layers, a layer mask can reveal a portion of a lower layer while hiding (either literally or figuratively) the rest of the layer.

In the example of FIG. 15, the mask 1500 includes the dog 1514 seen in the earlier example images. The mask 1500 may be configured such that the black portion of the mask (e.g., encompassing the dog 1514) are "visible" while the white portion is "hidden." In this case, the mask 1500 enables editing of the pixels for the dog 1514. Alternatively, it may be that the black portion of the mask 1500 is the hidden part, while the white portion is the visible part. In this case, the mask 1500 enables editing of all the pixels in the image except for the pixels for the dog 1514.

Figure 16:
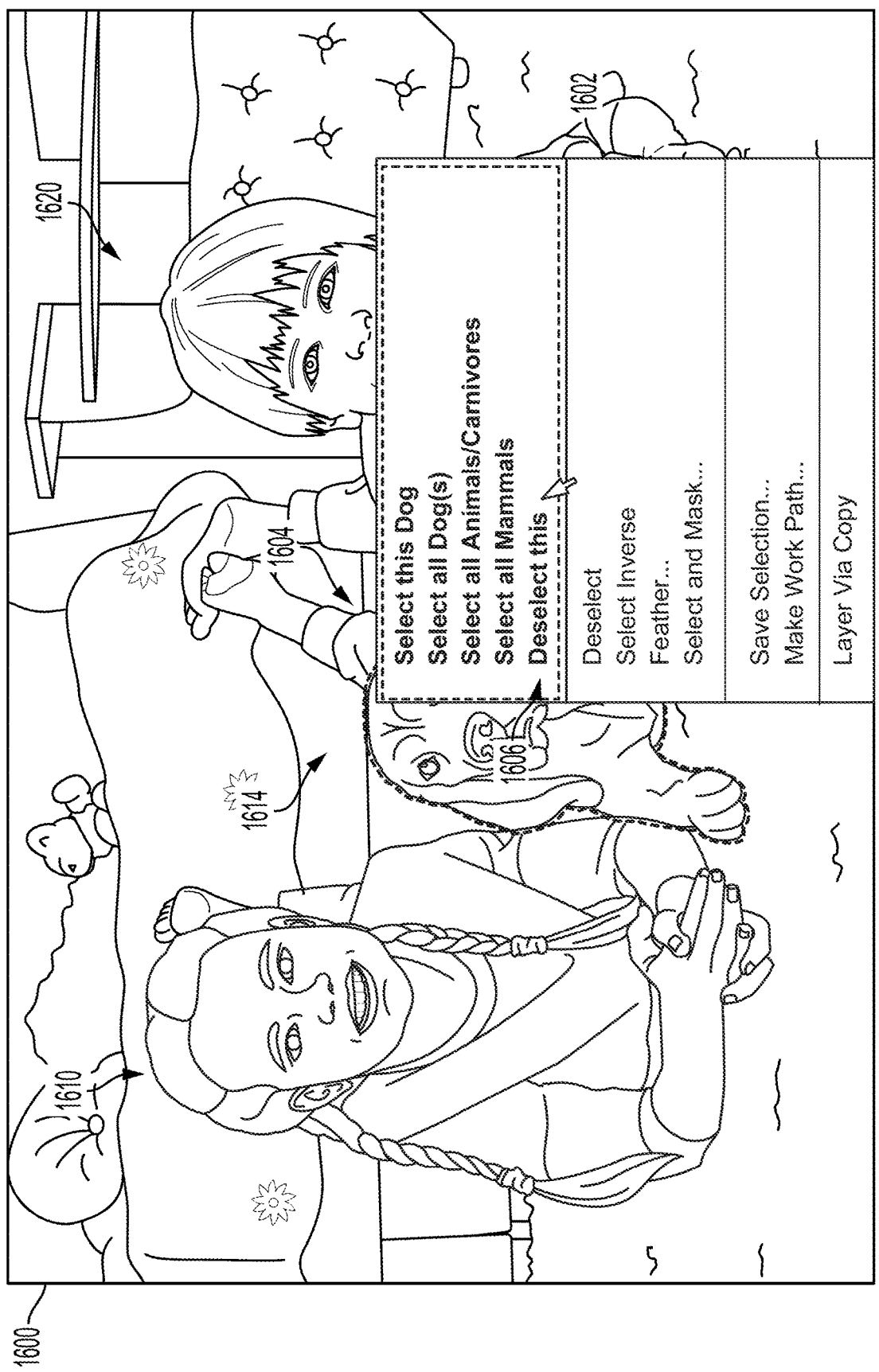
FIG. 16 includes a screenshot 1600 of an image as the image may appear while being edited in the user interface of an image editor.

In various examples, a content-aware selection system can also be used to deselect some or all of a selectin area. FIG. 16 includes a screenshot 1600 of an image as the image may appear while being edited in the user interface of an image editor. In the example of FIG. 16, a selection area was previously generated around the dog 1614, as indicated by a dashed line around the pixels representing the dog. While a content-aware selection tool was enabled, the user has subsequently clicked or tapped on the dog 1614, and has triggered display of an onscreen menu 1602. As before, the content-aware selection system has populated the onscreen menu 1602 is populated with a selection options list 1604 that includes a label for the dog 1614 and wider-category labels that describe the dog 1614 and other objects in the image.

The content-aware selection system has further determined that the user's input was within a current selection area. The content-aware selection system has thus added the option "Deselect this" (meaning, the dog 1614) to the selection options list 1604. Should the user select this option, the image editor will remove the selection area from around the dog.

The option to deselect objects by specifying an object's label can further simplify the generation of precise selection areas. For example, if the user had previously generated a selection area around the girl 1610 and the boy 1620 as well as the dog 1614, the user can remove the dog 1614 from the selection area without having to trim the existing selection area or start over with a new selection area.

In other examples, the selection options list can include additional deselection options, which may be based on the current selection area. For example, when the selection area includes more than one animal, the selection options list can also include "Deselect all Animals."

In various examples, voice commands can also be used to deselect objects. For example, instead of using the onscreen menu 1602, a user can speak the phrase "deselect the dog."

Figure 17:
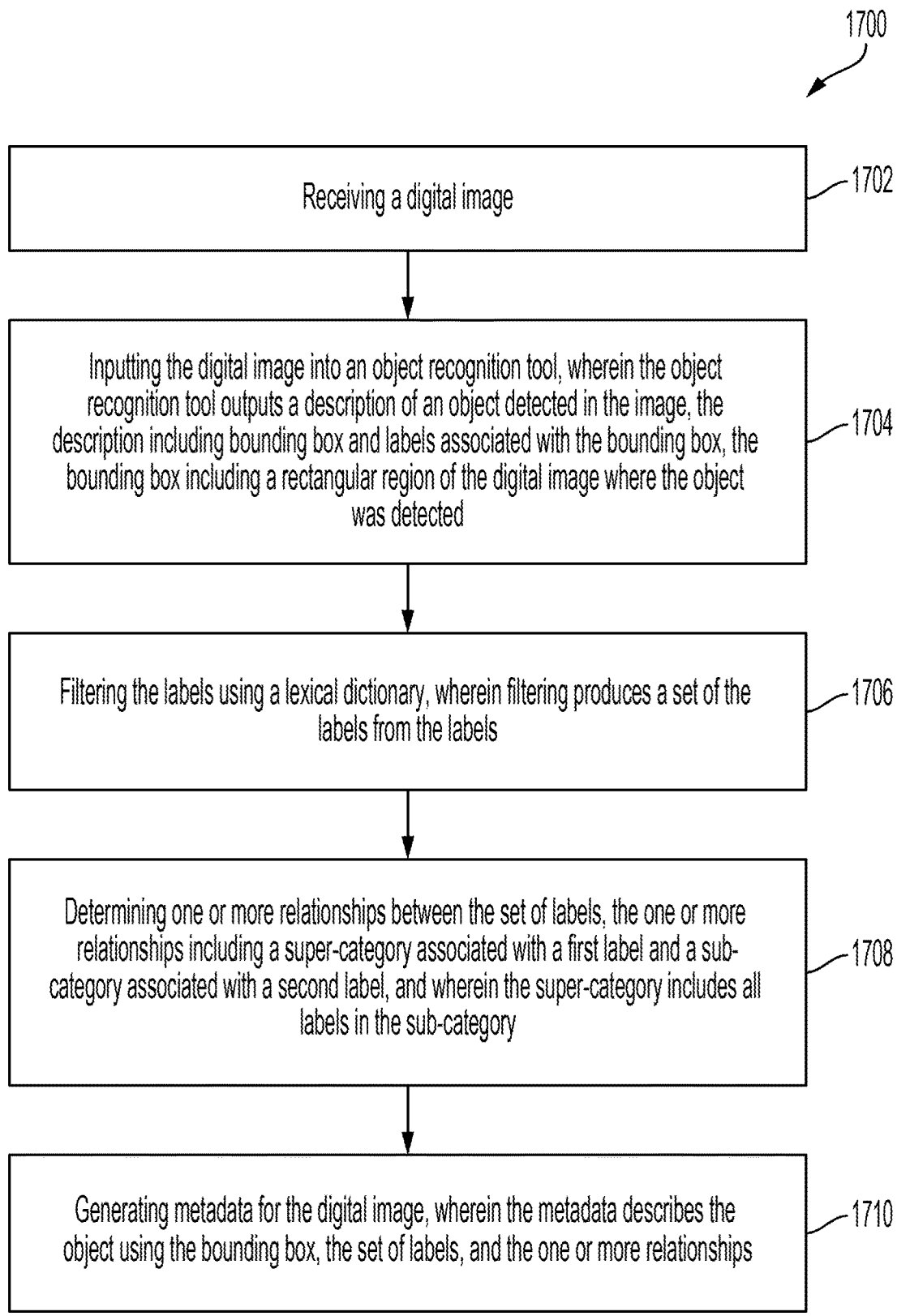
FIG. 17 includes a flowchart that illustrates an example of a process for identifying objects in a digital image.

FIG. 17 includes a flowchart that illustrates an example of a process 1700 for identifying objects in a digital image. The example process 1700 can be implemented by a content-aware selection system, which can be a component of an image editing program. The content-aware selection system can be executing on a computing device, where the computing device includes one or more processors and a non-transitory computer-readable medium. The steps of the process 1700 can be embodied as program instructions that can be stored on the non-transitory computer-readable medium, from which the instructions can be read and executed by the one or more processors. When executed, the instructions can cause the one or more processors to perform the steps of the process 1700.

At step 1702, the process 1700 includes receiving a digital image. The digital image can be received, for example, when the image is opened or loaded into the image editing program. Alternatively or additionally, the image can be received at other times, such as when the image editing program or another program requests processing of the image to identify the objects in the image. The digital image can be formatted according to an image file format, such as the JPEG, GIF, TIFF, or PNG formats, a proprietary format, or another format. The content-aware selection system may be able to read and decode the file, if needed, and determine values (e.g., color values or luminance and chrominance values, among other examples) for each of the pixel location in the image.

At step 1704, the process 1700 includes inputting the digital image into an object recognition tool. The object recognition tool subsequently outputs a description of an object detected in the image, the description including bounding box and labels associated with the bounding box, the bounding box including a rectangular region of the digital image where the object was detected. When the image includes multiple objects, the object recognition tool can output a bounding box for each object, with one or more labels for each bounding box, where the labels are single words or short phrases that describe the object.

In some examples, the object recognition tool uses a neural network to detect the object. In these examples, the neural network is trained for recognizing objects, for example using a set of images that have been assigned the words that describe the objects in the images. The object recognition tool can use, for example, a Faster R-CNN type of neural network to perform object recognition. In this and other examples, the object recognition tool produces one or more labels identifying the objects in an image, a bounding box (e.g., a region defined by a width, height, and location with the image, where the region includes pixels representing the object) for each object, and a confidence score indicating a degree of certainty that the labels are correct. In some examples, when the confidence score is less than a threshold, the object is removed from further analysis. A low confidence score may indicate that the labels might be incorrect, and/or that the object was insufficiently distinct in the image to be identified.

At step 1706, the process 1700 includes filtering the labels using a lexical dictionary, wherein filtering produces a set of the labels from the labels. The lexical dictionary can, for example, groups words that are conceptually similar. For example, the words "beagle" and "terrier" can be grouped under the term "dog." In this and other examples, the process 1700 can further include identifying, using the lexical dictionary, a first label from the labels for the object and a second label from the labels, where the first label and the second label are conceptually similar. The process 1700 can further include combining the first label and the second label into a new label. In this example, the new label is also conceptually similar to the original two labels, and is added to the labels for the object. Alternatively, as another example, the process 1700 can include determining, using the lexical dictionary, a priority between the first label and the second label. In this example, the process 1700 can include removing the first label based on the first label having a lower priority than the second label.

In some examples, the lexical dictionary can, alternatively or additionally, have priorities for words, where the priorities are based on frequency of usage. For example, among the conceptually similar words "person" and "human," "person" may be given a priority of 1 out of 10, and "human" 5 out of 10, which indicates that "person" is used, for example, five times more frequently than is "human." In some examples, the priorities can, alternatively or additionally, be absolute. For example, the word "girl" may have a priority of 1 out of 10 in all conceptual categories, which indicates that the word is so frequently use that the word should always be treated as important.

At step 1708, the process 1700 includes determining one or more relationships between the set of labels, the one or more relationships including a super-category associated with a first label and a sub-category associated with a second label, where the super-category includes all labels in the sub-category. In some examples, the lexical dictionary organizes conceptually similar words into super-categories and sub-categories, where words in a super-category describe words in a sub-category of the super-category. For example, the words "dog" and "cat" can be sub-categories of the super-category "animals." In these examples, 1700 can use the lexical dictionary to determine, for example, that the first label is a hypernym (e.g., super-category) of the second label, or that the second label is a hyponym (e.g., sub-category) of the first label. In this and other examples, determining the relationships enables the process 1700 to organize the labels so that multiple objects whose labels can be described by a super-category label can be referred to by the super-category label. Additionally, a super-category label can itself have a super-category when the super-category label is one of a group of conceptually similar labels.

The one or more relationships can be organized, for example in a tree of nodes, where each node including a label from the set of labels. In this example, a node that has sub-nodes has a label for a super-category of the labels at the sub-nodes. The tree can further have a root node that encompasses all the nodes of the tree, and thus can be used to describe all of the objects identified in the image. In some examples, each node also includes a count of sub-nodes of the node. In some examples, a leaf node is associated with the description of the object. For example, a leaf node can include a pointer or reference to the bounding box and/or label or labels for the object.

At step 1710, the process 1700 includes generating metadata for the digital image, wherein the metadata describes the object using the bounding box, the set of labels, and the one or more relationships. The metadata can be output, for example, in a binary format or in a textual format. In some examples, the process 1700 includes omitting the description of the object from the metadata when the confidence score for the object is less than a threshold.

Figure 18:
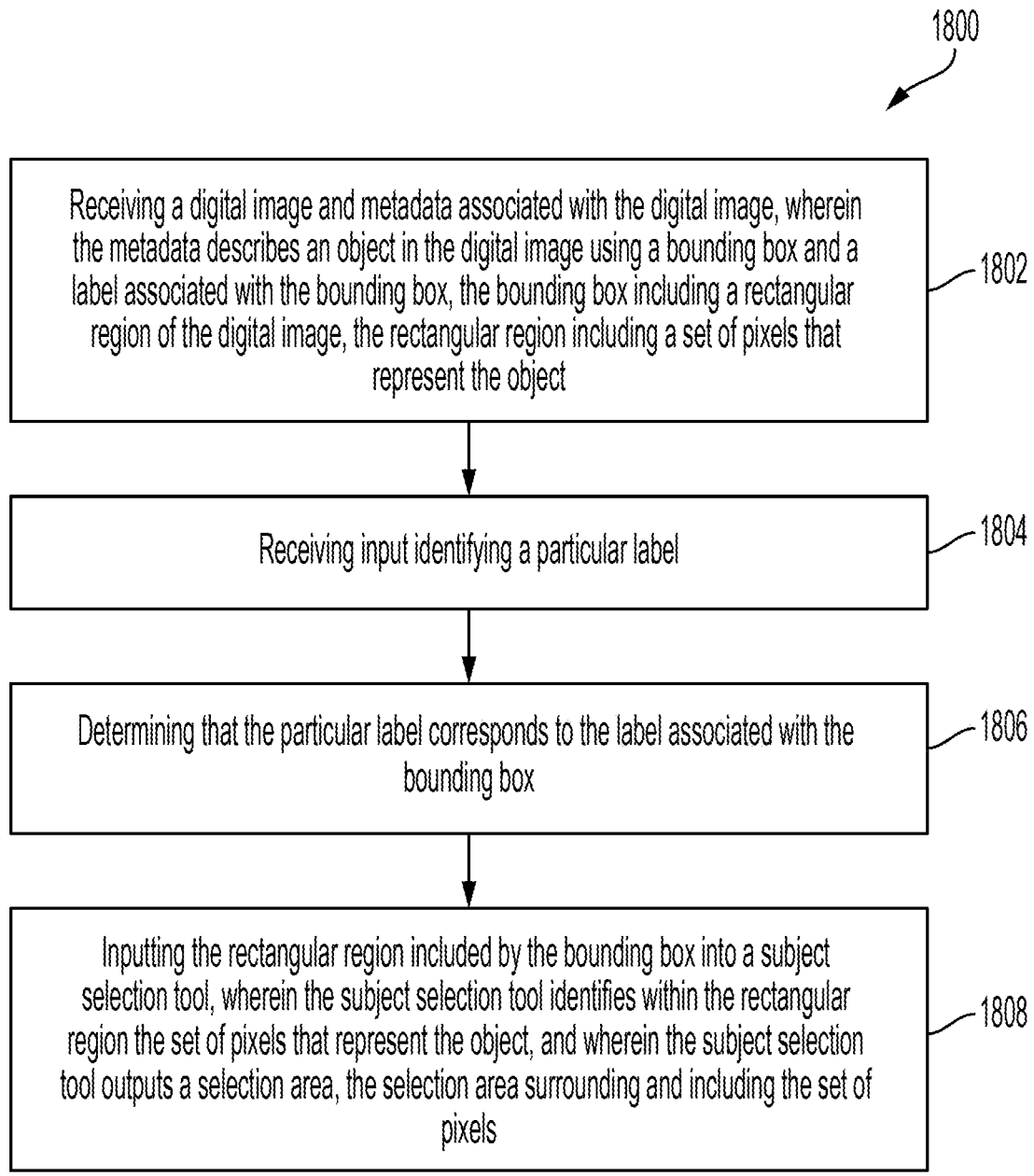
FIG. 18 includes a flowchart that illustrates an example of a process for generating a selection area that includes one or more objects in a digital image.

FIG. 18 includes a flowchart that illustrates an example of a process 1800 for generating a selection area that includes one or more objects in a digital image. The example process 1800 can be implemented by a content-aware selection system, which can be a component of an image editing program. The content-aware selection system can be executing on a computing device, where the computing device includes one or more processors and a non-transitory computer-readable medium. The steps of the process 1800 can be embodied as program instructions that can be stored on the non-transitory computer-readable medium, from which the instructions can be read and executed by the one or more processors. When executed, the instructions can cause the one or more processors to perform the steps of the illustrated process 1800.

At step 1802, the process 1800 includes receiving a digital image and metadata associated with the digital image. The digital image may have previously been decoded and read from a file, for example by the image editing program. In some examples, decoding and reading the file can also include extracting metadata from the file, such as the metadata provided at step 1802. This metadata describes an object in the digital image using a bounding box and a label associated with the bounding box, where the bounding box includes a rectangular region of the digital image. The rectangular region can include a set of pixels that represent the object. In some examples, the metadata describes multiple objects in the image, where each is described by a bounding box and at least one label.

At step 1804, the process 1800 includes receiving input identifying a particular label. In some examples, the input includes selection of a location within the digital image. For example, the image editor can detect the clicking of a mouse, tapping of a stylus on a touchscreen or digitizing tablet, or tapping of a capacitive object on a touchscreen, among other examples, at the location. In this example, identifying the particular label includes determining a particular bounding box that includes (e.g., surrounds or encompasses, or is within a certain number of pixels of) the location. In some examples, the input is derived from an onscreen menu. For example, the image editor can detect selection of an item from a pulldown menu or a context menu, where the item includes the particular label. In some examples, the input is a text string derived from voice input. For example, when the image editor supports voice commands, the editor can perform speech-to-text, and determine from the text that a command is directed to the process 1800. In this example, the image editor can provide the text to the process 1800, and the text can include the particular label.

At step 1806, the process 1800 includes determining that the particular label corresponds to the label associated with the bounding box. For example, the process 1800 can determine that the particular label is the same as the label of the bounding box. As another example, the process 1800 can determine that the particular label is for a super-category of the label. In these and other examples, the process 1800 can use relationships between the labels that is included in the metadata. For example, the metadata can describe relationships between objects in the digital image using a tree of nodes, where each node is associated with a label, and where node that has sub-nodes has a label that is a super-category for the labels of the sub-nodes. In this example, the process 1800 can match the particular label to a label at a node in the tree. When the label matches a node at a leaf, then the label refers to one, specific object. When the label matches a node that has sub-nodes, then the label matches a category of labels, including the label for the object detected at step 1802.

At step 1808, the process 1800 includes inputting the rectangular region included by the bounding box into a subject selection tool. The subject selection tool then identifies, within the rectangular region, the set of pixels that represent the object, and outputs a selection area, the selection area surrounding and including the set of pixels. In various examples, the subject selection tool uses a neural network to identify the set of pixels. The neural network can be trained for recognizing objects, for example by having been given a set of images whose contents had been tagged. In this and other examples, the neural network applies one or more filters to distinguish a pixel representing the object from other pixels in the digital image. In various examples, the subject selection tool can use other techniques to identify the pixels of the object, such as background subtraction.

Once the process 1800 has generated the selection area, the selection area can be used in various ways. For example, the user can request generation of a new layer, with the selection area to be used as an input to the new layer (e.g., as a layer mask, as an area of pixels to copy into the new layer, or for another use). In this example, the process 1800 can further include receiving input corresponding to generating of a new layer, and providing the label to be used as a name of the new layer.

In some examples, the process 1800 includes determining that the particular label is for a super-category, meaning that the particular label describes a group or class of labels for objects in the image rather than a specific object. In these examples, the process 1800 can further include determining that the super-category includes a second label associated with a second bounding box. The process 1800 can further include inputting a second rectangular region included by the second bounding box into the subject selection tool. The selection area generated by step 1808 will then also surround and include a second set of pixels representing a second object in the second rectangular region.

In some examples, the process 1800 includes receiving input corresponding to selection of a location within the digital image. The input may have been generated when, for example, a user clicked, using a mouse, on the image in the user interface of the image editing program, or tapped on the image using a stylus or a capacitive object (e.g., a finger). The process 1800 can further include determining that the location is within the rectangular region included by the bounding box. The process 1800 can further include generating a list of objects for which the selection area can be generated, the list of objects including the label.

In some examples, the process 1800 can further include generating an onscreen menu, the onscreen menu including the list of objects. In these examples, the input identifying the particular label is received when the particular label is selected from the onscreen menu.

In some examples, the process 1800 includes determining that the location indicated by the input is within a second rectangular region included by a second bounding box, where the second bounding box is associated with a second label. In these examples, the process 1800 further includes adding the second label to the list of objects.

In some examples, the process 1800 includes determining, from the metadata, that a second bounding box has a second label that is similar to the label. Similar can mean that the second label is a synonym or is conceptually similar. The process 1800 can determine similarity, for example, by examining relationships between the labels that is described in the metadata, where two labels that are similar have a common super-category. In these examples, the process 1800 can further include adding a pluralized version of the label to the list of objects. For example, the process 1800 can include determining, from the metadata, a second label, wherein the second label is for a super-category of the label. In this example, the process 1800 includes determining that the super-category includes more than one object, and adding the second label to the list of objects.

In some examples, wherein the input corresponding to selection of the location includes a stream of locations. For example, the user may be dragging a pointer across the image, and the user interface captures the pointer's changing location as a series or sequence of coordinates. In this and other examples, the process 1800 can include updating the list of objects for each location in the stream of locations. For example, as the user drags the pointer across the image, an onscreen menu changes as the pointer passes over different objects.

In some examples, the process 1800 includes receiving input corresponding to selection of a location within the digital image. The process 1800 can further include determining that the location is outside of all bounding boxes included in the metadata. For example, the location may be on a background of the image, or on an object that is too indistinct to be identified. In these and other examples, the process 1800 can further include generating a list of objects for which the selection area can be generated, the list of objects include a label for each bounding box included in the metadata. The list of objects can then be used to select any of the objects identified in the image. In some examples, the process 1800 can, alternatively or additionally, add a label (e.g., "All") to the list of objects, which can be used for selecting all objects.

Figure 19:
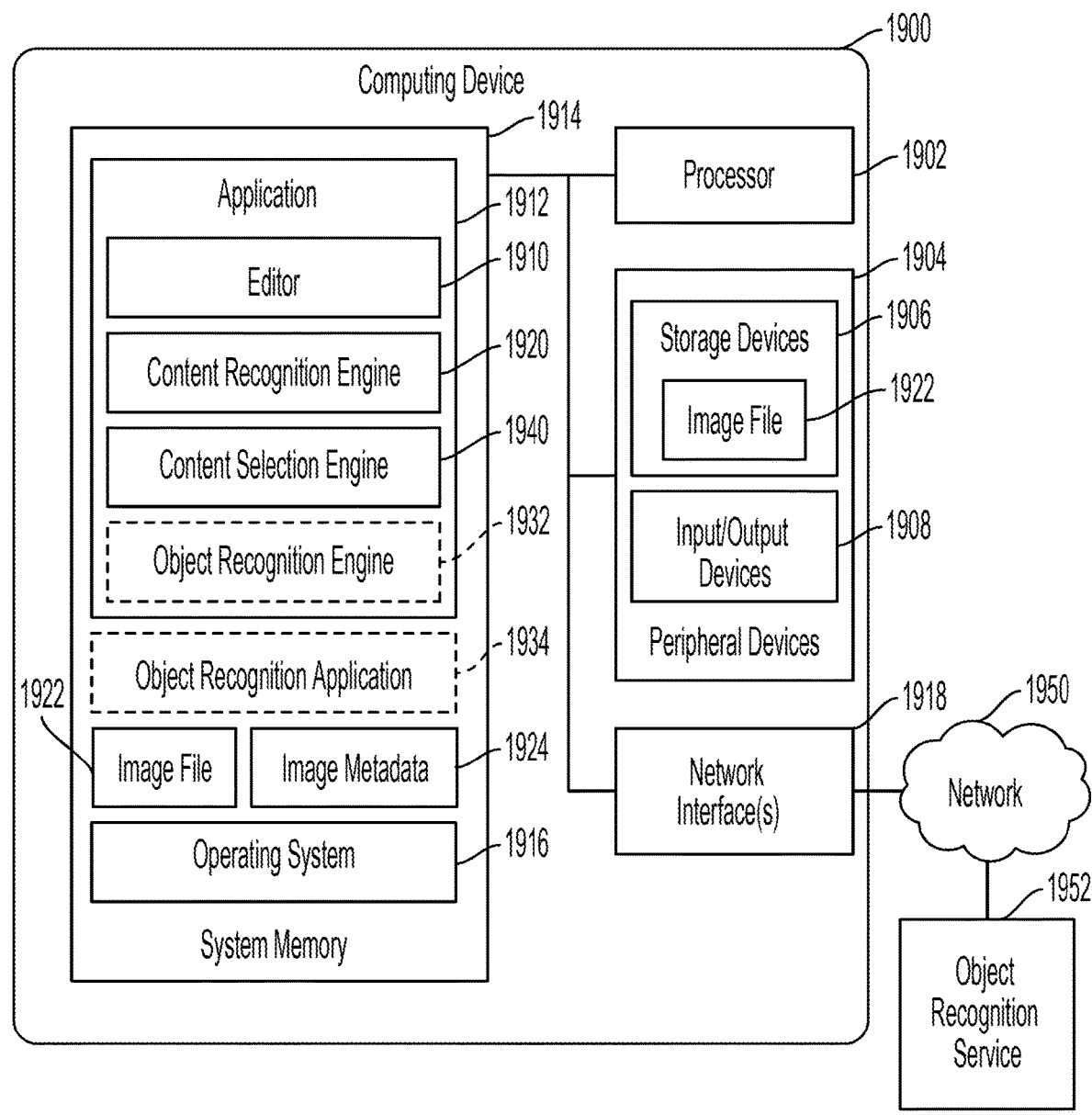
FIG. 19 includes a block diagram illustrating an example of a computing.

FIG. 19 includes a block diagram illustrating an example of a computing device 1900 on which components of the content-aware selection system discussed above can be executed. The computing device 1900 can be, for example, a desktop computer, a laptop computer, a tablet computer, or a smartphone, among other examples. The example computing device 1900 can include various hardware components, including a processor 1902, a system memory 1914 (which can also be referred to as processor memory or main memory), peripheral devices 1904, and one or more network interfaces 1918, among other examples. When in operation, the computing device 1900 can also include software components, such as an operating system 1916 and an application 1912. The computing device 1900 can also include software components when not in operation, such as software stored as firmware on other memory devices in the computing device 1900, and/or software stored on storage devices 1906, among other examples.

The processor 1902 is an integrated circuit device that can execute program instructions. The program instructions can be for executing an operating system 1916 and/or an application 1912. When executed by the processor 1902, the instructions cause the processor 1902 to perform the operations of the program. When being executed by the processor 1902, the instructions are stored in the system memory 1914, possibly along with data being operated on by the instructions. The system memory 1914 can be a volatile memory storage type, such as a Random Access Memory (RAM) type. The system memory 1914 is sometimes referred to as Dynamic RAM (DRAM) though need not be implemented using a DRAM-based technology. Additionally, the system memory 1914 can be implemented using non-volatile memory types, such as flash memory.

The peripheral devices 1904 can include various hardware components that can add functionality to the computing device 1900. In the example of FIG. 19, the peripheral devices 1904 include storage devices 1906 and input/output devices 1908. The storage devices 1906 can include non-volatile storage devices, such as optical or magnetic disks, or solid state drives, among other examples. The storage devices 1906 can be internal (e.g., mounted within the same chassis as the other illustrated components) or external (e.g., in a separate enclosure and connected to the computing device 1900 using a cable. In some examples, the storage devices 1906 can be located on the network 1950. The input/output devices 1908 can include various devices and/or connectors for devices that enable information to be displayed to a user, and for the use to input data into the computing device 1900. For example, the input/output devices 1908 can include display devices (e.g., screens or monitors), speakers, headphones, and/or printers, among other examples. The input/output devices 1908 can further include keyboards, mice, touchscreens, digitizing tablets, microphones, motion sensors, and scanners, among other examples. The peripheral devices 1904 can include other devices not illustrated here, such as a graphics accelerator.

The network interfaces 1918, which are also a type of peripheral device, enable the computing device 1900 to communicate with a network 1950. The network interfaces 1918 can include, for example, a socket for connecting a network cable and/or one or more antenna for communicating with wireless networks. When the network interfaces 1918 include more than one interface, the computing device 1900 may be able to communicate with different networks at the same time. The network 1950 can include private (e.g., firewalled and accessible only with authentication credentials) networks and/or public networks, such as the Internet.

The operations of the computing device 1900 can be coordinated and controlled by the operating system 1916. The operating system 1916 can, for example, cause the processor 1902 to load and execute applications activated by a user, such as the example application 1912 illustrated in FIG. 19. As a further example, the operating system 1916 can control access to and use of the hardware of the computing device 1900 by applications executing on the computing device 1900.

The example application 1912 of FIG. 19 can be an image editing program that includes a content-aware selection system. The application 1912 thus includes an editor 1910 in which a user can load an image for editing. The image may be loaded form an image file 1922 stored on one of the storage devices 1906 of the computing device 1900. Alternatively, the image file 1922 may be loaded over the network interfaces 1918 from a network location. Once loaded, the image file 1922 for the image may also be present in the system memory 1914.

The components of the content-aware selection system include a content recognition engine 1920 and a content selection engine 1940. In various examples, the content recognition engine 1920 and the content selection engine 1940 can execute independent of each other. For example, the application 1912 can invoke the content recognition engine 1920 when the application 1912 needs to recognize objects in an image, and once the content recognition engine 1920 has output metadata describing the objects, can close or shut down the content recognition engine 1920. As a further example, the application 1912 can invoke the content selection engine 1940 when the application 1912 needs to generate a content-based selection area, and can stop the content selection engine 1940 once the selection area is generated. In some examples, the content recognition engine 1920 and/or the content selection engine 1940, when not needed, can be executing as background processes, and need not be shut down when not in use.

As discussed above, the content recognition engine 1920 performs object recognition on the image, and generates image metadata 1924 that describes objects identified in the image and relationships between the objects. The image metadata 1924 can be stored the system memory 1914, where the image metadata 1924 is available for use by the content selection engine 1940 and other components of the application 1912. As also discussed above, the content selection engine 1940 can, upon being given a label of one or more objects in the image, use the image metadata 1924 to generate a selection area around the one or more objects.

As discussed above, the content recognition engine 1920 uses an object recognition engine 1932 to recognize objects in an image. In some examples, the object recognition engine 1932 can be a software process that executes within the application 1912. In some examples, the object recognition engine can, alternatively or additionally, be part of an independent object recognition application 1934 that can also be executing on the computing device 1900. In these examples, the content recognition engine 1920 can input the image into the object recognition application 1934, and receive object data in response. In some examples, the content recognition engine 1920 can, alternatively or additionally, use an object recognition service 1952 on the network 1950 to perform the object recognition and to obtain the object data.

Figure 20:
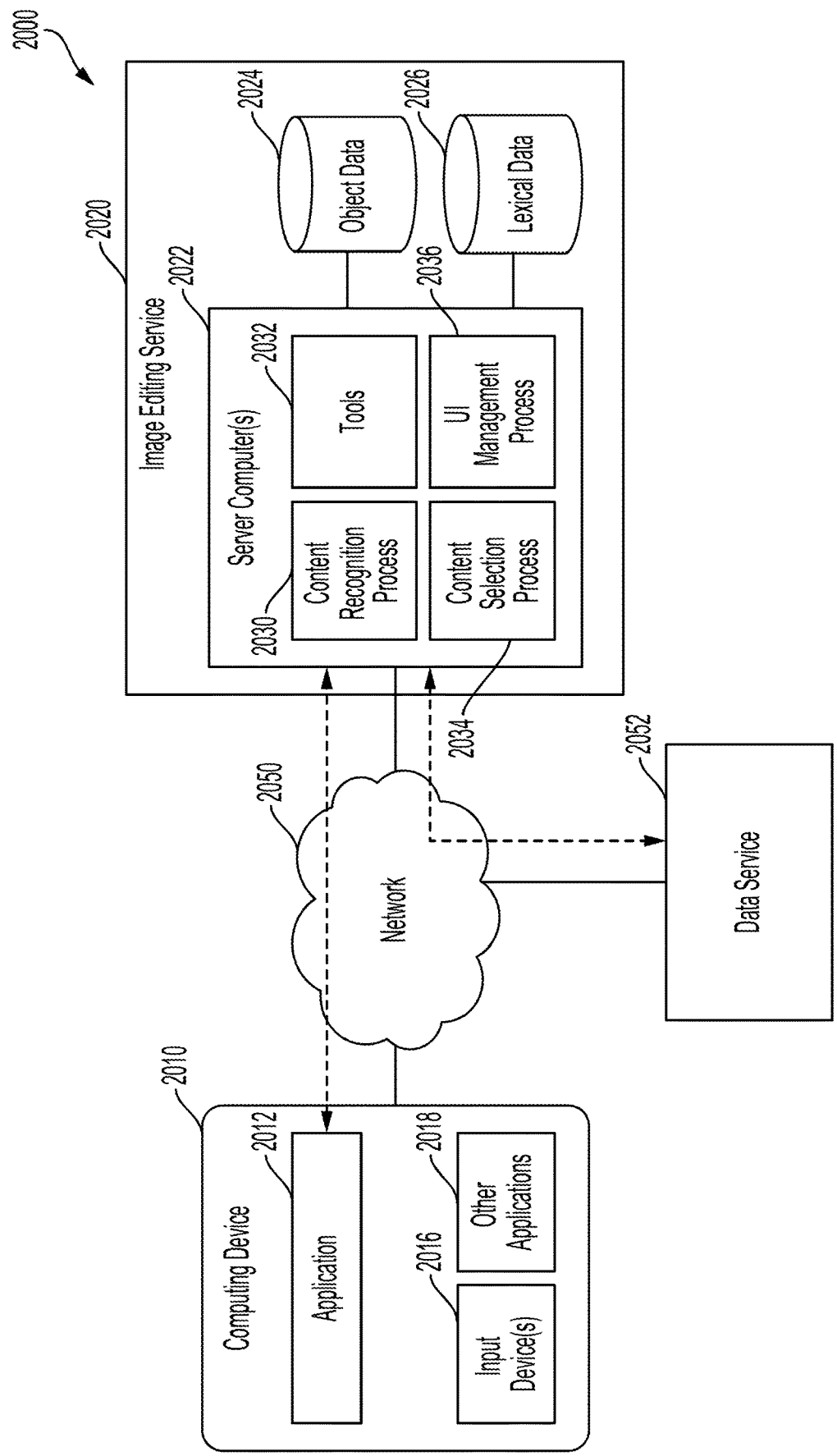
FIG. 20 is a diagram illustrating an example of an image editing.

FIG. 20 is a diagram illustrating an example of an image editing system 2000, which can be used to edit images on a computing device 2010. In various examples, the image editing system 2000 includes an image editing service 2020 that can provide image editing services to computing devices, such as a computing device 2010 illustrated in FIG. 20. In various examples, the image editing service 2020 can communicate with the computing device 2010 over a network 2050, which can include private networks and/or public networks such as the Internet. In some examples, the image editing service 2020 can optionally communicate over the network 2050 with a data service 2052 that can provide object recognition services.

The computing device 2010 of this example can include various types of electronic devices that include a microprocessor capable of executing instructions of computing code, memory for storing the instructions and/or other data, and network capability, such as a wired or wireless network card and/or a cellular antenna. Examples of such electronic devices include laptop computers, desktop computers, tablet computers, smart phones, personal digital assistants, smart watches, digital eyeglass systems, interne televisions, game consoles, and others.

The computing device 2010 can be associated with one user or multiple users. A user, in this context, is a digital entity that is maintained by a computing system, and for which various types of digital identifiers may exist that associate data with the user. For example, a user can be identified to a computing system by a username, which can be an alphanumeric string. In this example, the username can be associated with a user account on the computing system and/or on a network. The user account can further be associated with authentication data, such as a password, a security token, bioinformatic data, or other data that can be used to give a person access to the account, or to give the account access to the computing system. As another example, a user can be identified by an email address, a social media handle (e.g., a type of username), a gaming handle, a mobile telephone number, or another type of identifier. In some examples, one user can be associated with multiple user accounts. In some examples, one user can be associated with multiple email addresses, social media handles, or other identifiers. In some examples, more than one person (e.g., a human being) can be associated with the same user. For example, a team of network administrators may each have access to the same user account.

In various examples, the computing device 2010 can include hardware and software that enable the computing device 2010 to interact with the image editing service 2020 so that a user can make use of the image editing operations of the image editing service 2020. For example, the computing device 2010 can execute an application 2012 through which a user can interact with the image editing service 2020 to edit an image. The application 2012 can be one provided by the image editing service 2020. The application 2012 can include a graphical user interface that can be output using a display of the device 2010, and through which a user can view an image. The application 2012 can further enable access to the editing capabilities of the image editing service 2020. The computing device 2010 can further include input devices 2016, such as a mouse, a keyboard, a digitizing tablet, a touchscreen, and/or microphones, that enable the user to perform editing operations. In various examples, other applications 2018 can also be executing on the computing device 2010.

In various examples, the image editing service 2020 can be implemented using various software processes executing on or more server computers 2022. The software processes can include, for example, a content recognition process 2030, tools 2032, a content selection process 2034, and a user interface (UI) management process 2036, among others. The image editing service 2020 can further include one or more data stores to store data such as object data 2024 and lexical data 2026, among other data. The data stores can be implemented using, for example, hard drives, solid state drives, or another form of non-volatile storage memory.

The server computers 2022 on which the processes execute can be computing devices that include one or more processors capable of executing program instructions and memory for storing the program instructions. The server computers 2022 and the data stores can, for example, be housed in a data center and/or provided as a service from a data center. Alternatively or additionally, the server computers 2022 and the data stores can be housed in a network operated and controlled by the image editing service 2020.

The content recognition engine content recognition process 2030 can implement a content recognition engine performs object recognition on the image, and generates image metadata that describes objects identified in the image and relationships between the objects. The content recognition process 2030 can receive an image from the application 2012, for example when the image is loaded into the application 2012 or at another time. The content recognition process 2030 can store the metadata on the server computers 2022 of the image editing service 2020, and/or can send the metadata to the computing device 2010 for use by the application 2012. To perform object recognition, the content recognition process 2030 may make use of object data 2024 stored at the image editing service 2020. The object data 2024 can include, for example, data for a neural network that has been trained to on a library of images that are representative of the images edited by subscribers to the image editing service 2020. To filter object labels and determine relationships between the objects, the content recognition process 2030 can use lexical data 2026 stored at the image editing service 2020. The lexical data 2026 can include a lexical dictionary that groups together conceptually similar words and/or indicates a frequency of usage of words among a population.

The content selection process 2034 can implement a content selection engine that can, upon being given a label of one or more objects in an image, generate a selection area around the one or more objects. The content selection process 2034 can receive the label from the application 2012, and/or can perform steps to determine the label. For example, the content selection process 2034 can determine a location indicated by the user using an input device 2016 of the computing device 2010. In this example, the content selection process 2034 can determine one or more bounding boxes at the location, and can determine the label from these bounding boxes. Alternatively or additionally, the content selection process 2034 can provide the labels of the bounding boxes to the application 2012 for output by the application 2012. In some examples, determining a location indicated by the user is performed at the computing device 2010, and the location is provided to the content selection process 2034.

The tool 2032 can be various processes that enable the user to make changes to an image. The tools 2032 can include, for example, editing tools, drawing tools, and/or selection tools, among other examples. The user interface management process 2036 can manage the transfer of data between the image editing service 2020 and the user interface of the application 2012, so that user does not experience delay while using the application 2012. The image editing service 2020 can further include other processes that are not illustrated here.

Figure 21:
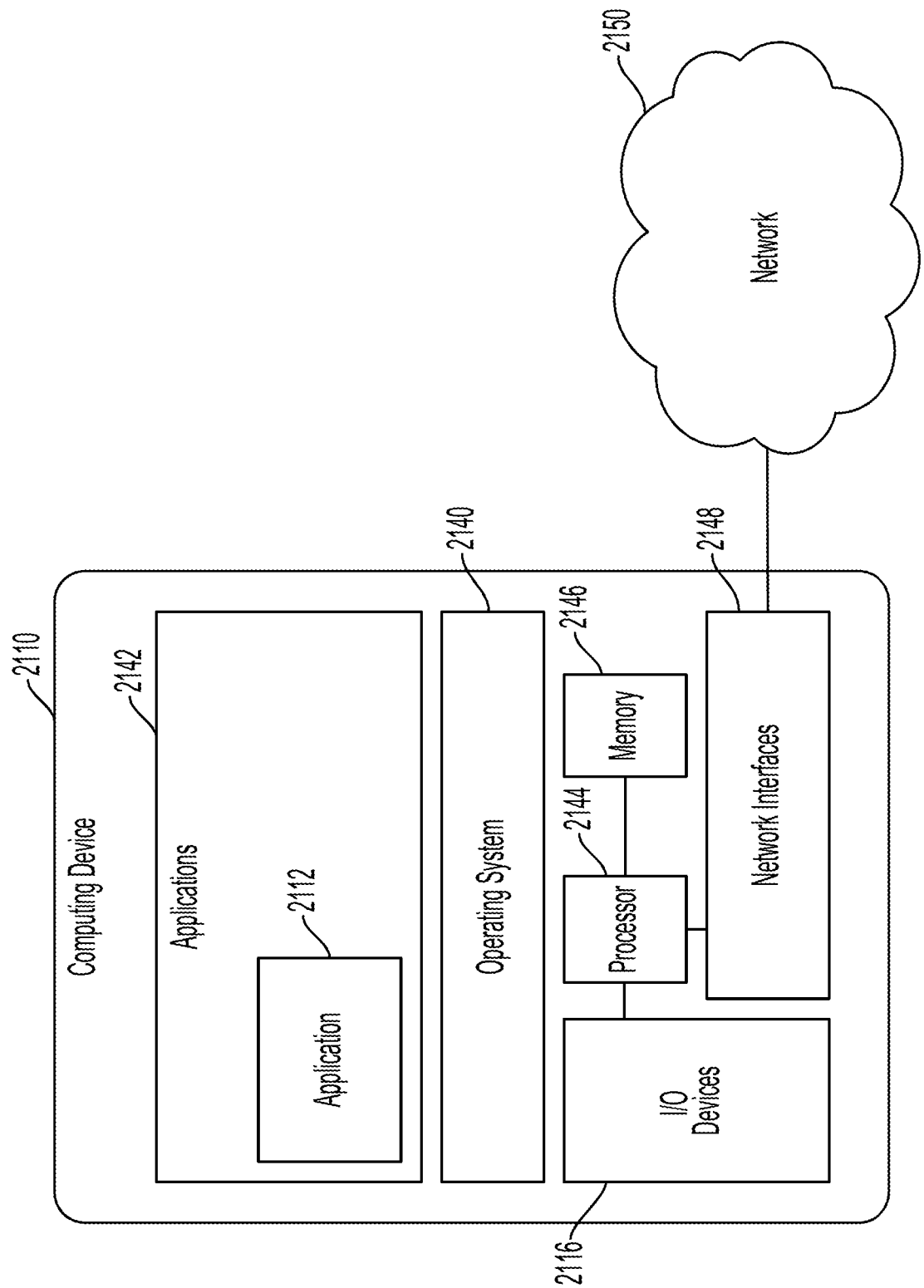
FIG. 21 includes a block diagram illustrating an example of a computing device illustrated in FIG. 20.

FIG. 21 includes a block diagram illustrating an example of a computing device 2110, such as the computing device illustrated in FIG. 20. The example computing device 2110 of FIG. 21 can include various software components and software components, which can be used in various combinations to access an image editing service from the computing device 2110.

In various examples, the software components can include an operating system 2140 and applications 2142. The operating system 2140 can manage the various operations of the computing device 2110, including the applications 2142 executing on the computing device 2110 and the computing device's hardware. The applications 2142 can include programs accessible to a user of the computing device 2110, including a delivery application 2112, through which the user can interact with the image editing service.

In various examples, the hardware components can include a processor 2144, memory 2146, Input/Output (I/O) devices 2116, and network interfaces 2148, among other components. The processor 2144 can be an integrated circuit device that is operable to execute program instructions, including the instructions for executing the operating system 2140 and the applications 2142. The memory 2146 can store the program instructions while the processor 2144 is executing the instructions, and/or while the computing device 2110 is powered off. In various examples, the computing device 2110 can include multiple memories, including volatile and/or non-volatile memories. Non-volatile memories can also be described as non-transitory. The I/O devices 2116 can include user input and output devices, such as display screens, touch screens, keyboards, mice, and so on. The I/O devices 2116 can further include location devices, such as a Global Positioning System (GPS) receiver. The network interfaces 2148 can include wired and/or wireless network devices, such as a network port, a Wi-Fi antenna, and/or cellular antennas, among other examples. The network interfaces 2148 can enable the computing device 2110 to communicate with a network 2150, including, for example, the Internet.

Figure 22:
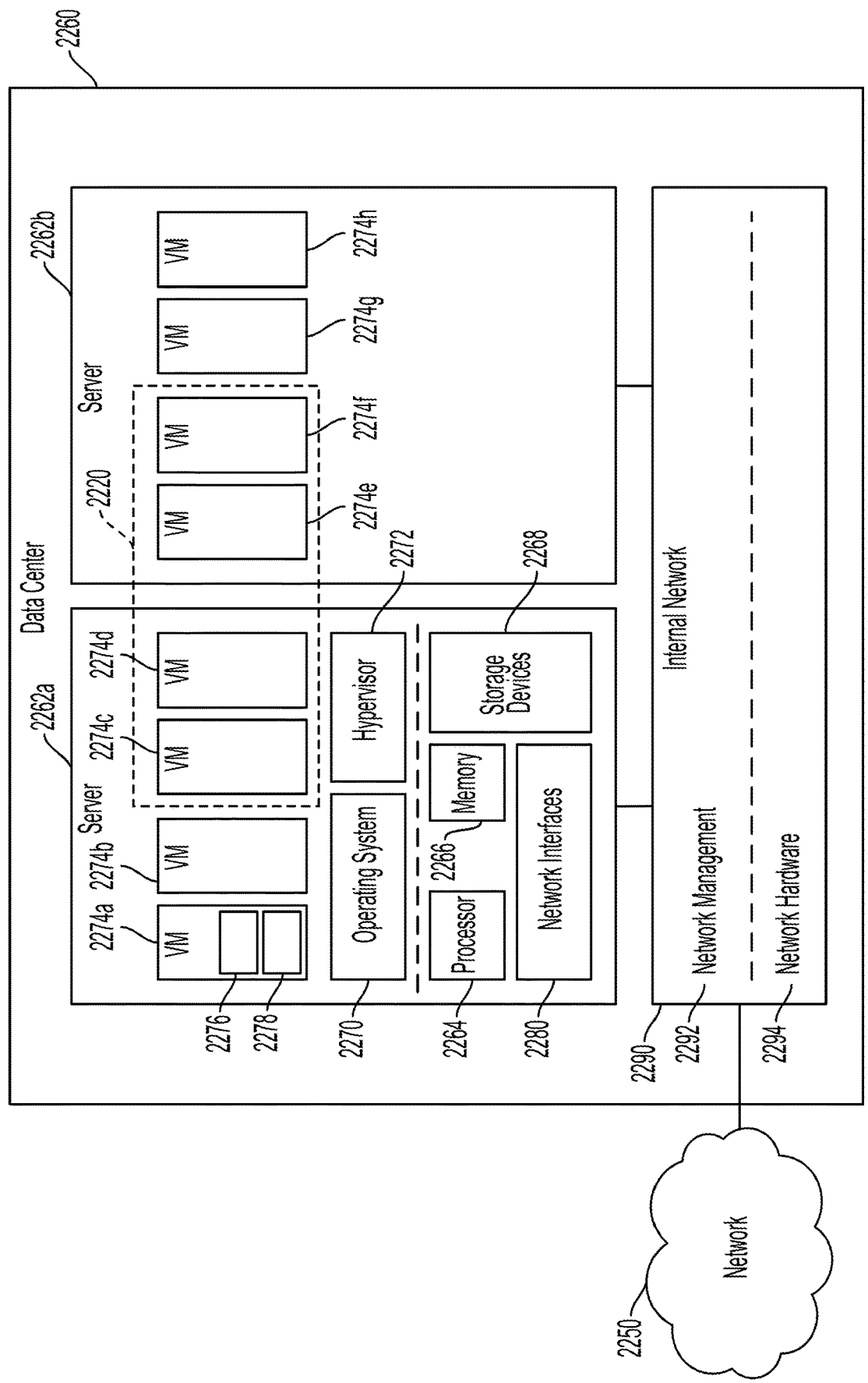
FIG. 22 includes a block diagram illustrating an example of a data center, which can host an image editing service.

FIG. 22 includes a block diagram illustrating an example of a data center 2260, which can host an image editing service 2220, such as the image editing service illustrated in FIG. 20. The data center 2260 can be operated by an entity other that the entity that controls the image editing service 2220, and may be leasing resources to the operator of the image editing service 2220. Alternatively, the data center 2260 may be operated by the entity that controls the image editing service 2220.

The data center 2260 can include multiple servers 2262a-2262b, of which two are illustrated here. A server can be a computing device configured primarily for being accessed over a network, and possibly for simultaneous use by multiple, unrelated users. An example of a configuration of a server is illustrated by a first server 2262a in FIG. 22. As illustrated by the first server 2262a, a server can include a software layer and a hardware layer.

The software layer can include, for example, an operating system 2270 a hypervisor 2272, and virtual machines 2274a-2274d, among other software and applications. The operating system 2270 can control and coordinate the operations of the first server 2262a, including execution of the hypervisor 2272, the virtual machines 2274a-2274d, and operation of the hardware. The hypervisor 2272, which can also be referred to as a kernel-based virtual machine (KVM) or a virtual machine monitor (VMM), can manage the virtual machines 2274a-2274d. For example, the hypervisor 2272 can handle operations such as bringing up new virtual machines, use of the virtual machines of the first server's hardware, and taking down virtual machines, among other operations. In some examples, the hypervisor 2272 is integrated into the operating system 2270.

A virtual machine is an emulated computer system running on the hardware of a physical computer system. As illustrated by a first virtual machine 2274a, a virtual machine can include a virtual representation of computer hardware 2278, which may but need not map to the physical hardware of the computing system on which the virtual machine is running. The virtual machine can further include software 2276 that is running on top of the virtual hardware 2278. The software 2276 can include an operating system and applications that are separate and distinct from the operating system 2270 and applications of the first server 2262a. As with physical computing systems, virtual machines can be isolated from one another, and a user operating within one virtual machine may be unaware of the existence of other virtual machines on the same system. The virtual machines 2274a-2274h illustrated in FIG. 22 can each have a similar configuration as is illustrated for the first virtual machine 2274a, with variations in the software executed and/or the particular configuration of the virtual hardware.

The hardware layer of the example first server 2262a can include a processor 2264, memory 2266, storage devices 2268, and a network interface 2280, among other hardware. The processor 2264 is an integrated circuit device operable to execute program instructions, including the instructions for the programs executing in the software layer of the first server 2262a. In some examples, the first server 2262a can include multiple processors. In some examples, a processor can include multiple processing cores. While the processor 2264 is executing program instructions, the program instructions can be stored in the memory 2266. In various examples, the memory 2266 can be volatile memory and/or non-volatile memory. In various examples, the first server 2262a can include multiple different memories. The storage devices 2268 can include non-volatile storage systems, such as hard drives, flash drives, and/or solid state drives, among other examples. While not being executed, and, in some cases, while being executed, program instructions can be stored on the storage devices 2268. The memory 2266 and the storage devices 2268 illustrate two examples of non-transitory computer-readable mediums. The network interfaces 2280 can include hardware and software for connecting the first server 2262a to a network, such as the internal network 2290 of the data center 2260. In some examples, the first server 2262a can include multiple network interfaces 2280 so that the first server 2262a can maintain multiple connections to the internal network 2290.

In various examples, other servers in the data center 2260, such as a second server 2262b, can be configured similarly to the first server 2262a, possibly with variations in the software being executed, the number of virtual machines running at any given time, and/or variations in the hardware included in the server.

The internal network 2290 of the data center 2260 can connect the servers 2262a-2262b of the data center 2260 to each other and to external networks 2250, such as the Internet. The internal network 2290 can include network management 2292 software, which can perform operations such as balancing the workload on each of the servers 2262a-2262b, bringing up and taking down servers, and/or assigning the data center's customers to servers and/or virtual machines on the servers, among other operations. The internal network 2290 can further include network hardware 2294, such as the routers, switches, hubs, and gateways that form the internal network 2290.

A customer of the data center 2260 can include the image editing service 2220. The image editing service 2220 can, for example, be assigned one or more virtual machines in the data center 2260, which the image editing service 2220 can use for executing the various processes of the image editing service 2220. The data center 2260 can be configured such that the operator of the image editing service 2220 need not know where the virtual machines assigned to the image editing service 2220 are executing. In the example of FIG. 22, the image editing service 2220 has been assigned several virtual machines executing on the first server 2262a and several executing on the second server 2262b. In various examples, the data center 2260 may determine to move the image editing service 2220 to different servers, and may thus migrate the operations of the image editing service 2220 from one virtual machine to another.

In various examples, the operator of the image editing service 2220 can access the virtual machines assigned to the image editing service 2220 from the network 2250. For example, the data center 2260 can provide a console or graphical user interface through which the operator can configure the virtual machines. In various examples, the data of the image editing service 2220 can be stored on the storage devices 2268 of the servers, and/or on network attached storage devices in the data center 2260.

The services of the image editing service 2220 can further be provided over the network 2250 to users. For example, the virtual machines assigned to the image editing service 2220 can each include a virtual network interface, through which the virtual machines can communicate with the network 2250. Communications can include receiving input, including images and instructions for editing the images, from user devices and/or transmitting updated versions of the images and/or results of performing the instructions to the user devices.

Specific details were given in the preceding description to provide a thorough understanding of various implementations of systems and components for a content-aware selection system. It will be understood by one of ordinary skill in the art, however, that the implementations described above may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

It is also noted that individual implementations may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

The various examples discussed above may further be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable storage medium (e.g., a medium for storing program code or code segments). A processor(s), implemented in an integrated circuit, may perform the necessary tasks.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the implementations disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for a content-aware selection system.

What is claimed is:

1. A computer-implemented method, comprising:
receiving metadata information for a plurality of objects depicted in a digital image, wherein, for each object in the plurality of objects, the metadata information comprises a label associated with that object;
generating a set of hierarchical relationships among the labels identified in the metadata information for the plurality of objects;
receiving a user input directed to a location within the digital image;
based upon the location, identifying a first object from the plurality of objects and a first label associated with the first object;
determining, based upon the set of hierarchical relationships, a second label that is included in the set of hierarchical relationships;
generating a menu comprising a plurality of user-selectable options for selecting one or more of the plurality of objects, the plurality of user-selectable options comprising a first option based upon the first label and a second option based upon the second label; and outputting the menu including the plurality of user-selectable options via an output device.

2. The computer-implemented method of claim 1, further comprising:
determining that the location is within a region of the digital image that includes a set of pixels representing the first object;
identifying a first bounding box for the first object;
determining that the region of the digital image is included in a second bounding box for an additional object from the plurality of objects, wherein an additional label is associated with the additional object; and
responsive to determining that the region of the digital image is included in the second bounding box, including an additional option in the menu based upon the additional label.

3. The computer-implemented method of claim 1, further comprising:
determining that, in the set of hierarchical relationships, the second label and the first label are hierarchically related via a super-category that includes the first label and the second label,
wherein the second option is one of:
a pluralized version of the first label, or
a pluralized version of the super-category.

4. The computer-implemented method of claim 1, further comprising:
determining that, in the set of hierarchical relationships, the second label and the first label are hierarchically related via a super-category that includes the first label and the second label; and
responsive to determining that the second label and the first label are hierarchically related via the super-category, including an additional option in the menu based upon the super-category.

5. The computer-implemented method of claim 1, further comprising:
generating the metadata information for the plurality of objects by performing object recognition on the digital image.

6. The computer-implemented method of claim 1, further comprising:
generating a relationship tree data structure that indicates the set of hierarchical relationships, the relationship tree data structure including:
a sub-node corresponding to the first label associated with the first object, and
a super-node corresponding to a super-category of the first label, wherein the super-node encompasses the sub-node.

7. The computer-implemented method of claim 6, wherein the super-node indicates a count of labels corresponding to sub-nodes encompassed by the super-node.

8. The computer-implemented method of claim 1, further comprising:
filtering the labels identified in the metadata information, wherein filtering the labels identified in the metadata information produces a subset of labels,
wherein generating the set of hierarchical relationships is performed using the subset of labels.

9. The computer-implemented method of claim 8, wherein filtering the labels identified in the metadata information is performed using a lexical dictionary.

10. The computer-implemented method of claim 8, wherein:

the metadata information for the plurality of objects further comprises, for each object in the plurality of objects, a bounding box that includes a set of pixels representing that object,
filtering the labels identified in the metadata information includes:
determining an overlap between a first bounding box associated with the first object and a second bounding box associated with a second object from the plurality of objects; and
omitting, from the subset of labels, an additional label associated with the second object, responsive to determining a conceptual similarity between the first label and the additional label.

11. A computing device executing a content-aware selection system, the computing device comprising:
one or more processors; and
a memory component configured to implement instructions that, when executed by the one or more processors, cause the one or more processors to perform operations including:
receiving metadata information for a plurality of objects depicted in a digital image, wherein, for each object in the plurality of objects, the metadata information comprises a label associated with that object;
generating a set of hierarchical relationships among the labels identified in the metadata information for the plurality of objects;
receiving a user input directed to a location within the digital image;
based upon the location, identifying a first object from the plurality of objects and a first label associated with the first object;
determining, based upon the set of hierarchical relationships, a second label that is included in the set of hierarchical relationships;
generating a menu comprising a plurality of user-selectable options for selecting one or more of the plurality of objects, the plurality of user-selectable options comprising a first option based upon the first label and a second option based upon the second label; and
outputting the menu including the plurality of user-selectable options via an output device.

12. The computing device of claim 11, wherein the instructions further cause the one or more processors to perform operations including:
determining that the location is within a region of the digital image that includes a set of pixels representing the first object;
identifying a first bounding box for the first object;
determining that the region of the digital image is included in an additional bounding box for an additional object from the plurality of objects, wherein an additional label is associated with the additional object; and
responsive to determining that the region of the digital image is included in the additional bounding box, including an additional option in the menu based upon the additional label.

13. The computing device of claim 11, wherein the instructions further cause the one or more processors to perform operations including:
determining that, in the set of hierarchical relationships, the second label and the first label are hierarchically related via a super-category that includes the first label and the second label, wherein the second option is one of:
a pluralized version of the first label, or
a pluralized version of the super-category.

14. The computing device of claim 11, wherein the instructions further cause the one or more processors to perform operations including:
determining that, in the set of hierarchical relationships, the second label and the first label are hierarchically related via a super-category that includes the first label and the second label; and
responsive to determining that the second label and the first label are hierarchically related via the super-category, including an additional option in the menu based upon the super-category.

15. The computing device of claim 11, wherein the instructions further cause the one or more processors to perform operations including:
generating a relationship tree data structure that indicates the set of hierarchical relationships, the relationship tree data structure including:
a sub-node corresponding to the first label associated with the first object, and
a super-node corresponding to a super-category of the first label, wherein the super-node encompasses the sub-node.

16. The computing device of claim 11, wherein the instructions further cause the one or more processors to perform operations including:
filtering the labels identified in the metadata information, wherein filtering the labels identified in the metadata information produces a subset of labels,
wherein generating the set of hierarchical relationships is performed using the subset of labels.

17. The computing device of claim 16, wherein:
the metadata information for the plurality of objects further comprises, for each object in the plurality of objects, a bounding box that includes a set of pixels representing that object,
filtering the labels identified in the metadata information includes:
determining an overlap between a first bounding box associated with the first object and a second bounding box associated with a second object from the plurality of objects; and
omitting, from the subset of labels, an additional label associated with the second object, responsive to determining a conceptual similarity between the first label and the additional label.

18. A non-transitory computer-readable medium having stored thereon instructions that, when executed by one or more processors, cause the one or more processors to perform operations including:
receiving metadata information for a plurality of objects depicted in a digital image, wherein, for each object in the plurality of objects, the metadata information comprises a label associated with that object;
generating a set of hierarchical relationships among the labels identified in the metadata information for the plurality of objects;
receiving a user input directed to a location within the digital image;
based upon the location, identifying a first object from the plurality of objects and a first label associated with the first object;
determining, based upon the set of hierarchical relationships, a second label that is included in the set of hierarchical relationships;
generating a menu comprising a plurality of user-selectable options for selecting one or more of the plurality of objects, the plurality of user-selectable options comprising a first option based upon the first label and a second option based upon the second label; and
outputting the menu including the plurality of user-selectable options via an output device.

19. The non-transitory computer-readable medium of claim 18, further comprising instructions that, when executed by the one or more processors, cause the one or more processors to perform operations including:
determining that the location is within a region of the digital image that includes a set of pixels representing the first object;
identifying a first bounding box for the first object;
determining that the region of the digital image is included in an additional bounding box for an additional object from the plurality of objects, wherein an additional label is associated with the additional object; and
responsive to determining that the region of the digital image is included in the additional bounding box, including an additional option in the menu based upon the additional label.

20. The non-transitory computer-readable medium of claim 18, further comprising instructions that, when executed by the one or more processors, cause the one or more processors to perform operations including:
determining that, in the set of hierarchical relationships, the second label and the first label are hierarchically related via a super-category that includes the first label and the second label; and
responsive to determining that the second label and the first label are hierarchically related via the super-category, including an additional option in the menu based upon the super-category.

* * * * *